US009105278B2

(12) United States Patent
Tajima et al.

(10) Patent No.: US 9,105,278 B2
(45) Date of Patent: Aug. 11, 2015

(54) OPTICAL INFORMATION RECORDING MEDIUM HAVING SUPER-RESOLUTION FILM

(71) Applicants: Sharp Kabushiki Kaisha, Osaka-shi, Osaka (JP); Memory-Tech Corporation, Chikusei-shi, Ibaraki (JP)

(72) Inventors: Hideharu Tajima, Osaka (JP); Go Mori, Osaka (JP); Yasuhiro Harada, Osaka (JP); Masaki Yamamoto, Osaka (JP); Hirohisa Yamada, Osaka (JP); Masahito Konishi, Chikusei (JP)

(73) Assignees: Sharp Kabushiki Kaisha, Osaka (JP); Memory-Tech Corporation, Ibaraki (JP)

( * ) Notice: Subject to any disclaimer, the term of this patent is extended or adjusted under 35 U.S.C. 154(b) by 0 days.

(21) Appl. No.: 14/533,378

(22) Filed: Nov. 5, 2014

(65) Prior Publication Data

US 2015/0055445 A1    Feb. 26, 2015

Related U.S. Application Data

(63) Continuation of application No. 14/328,826, filed on Jul. 11, 2014, now Pat. No. 8,913,476, which is a continuation of application No. 14/183,800, filed on Feb. 19, 2014, now Pat. No. 8,817,587, which is a continuation of application No. 13/702,613, filed as application No. PCT/JP2011/063405 on Jun. 10, 2011, now Pat. No. 8,699,313.

(30) Foreign Application Priority Data

Jun. 11, 2010  (JP) .................................. 2010-134198

(51) Int. Cl.
G11B 7/24        (2013.01)
G11B 7/013       (2006.01)
(Continued)

(52) U.S. Cl.
CPC ............ *G11B 7/013* (2013.01); *G11B 7/00745* (2013.01); *G11B 7/24038* (2013.01);
(Continued)

(58) Field of Classification Search
None
See application file for complete search history.

(56) References Cited

U.S. PATENT DOCUMENTS 5,659,537 A * 8/1997 Hirokane et al. .......... 369/275.2
6,511,788 B1 * 1/2003 Yasuda et al. ............. 430/270.13
(Continued)

OTHER PUBLICATIONS

Tajima et al., "Optical Information Recording Medium", U.S. Appl. No. 13/702,613, filed Jan. 25, 2013.
(Continued)

*Primary Examiner* — Tan X Dinh
(74) *Attorney, Agent, or Firm* — Keating & Bennett, LLP

(57) ABSTRACT

An optical information recording medium has a first information recording layer (20) and a second information recording layer (40) each of which includes (i) a group of pre-pits (31, 51) constituting marks (32, 52) and spaces (33, 53) and (ii) a super-resolution film (23, 43), the marks (32, 52) and the spaces (33, 53) having different lengths, an average length of a smallest mark that is smallest in length and a smallest space that is smallest in length being less than or equal to a resolution limit of a reproduction optical system for reproducing information recorded on the first information recording layer (20) and the second information recording layer (40), the group of pre-pits (31, 51) being formed so that a push-pull signal for the reproduction optical system to reproduce the information recorded by the group of pre-pits is negative in polarity. This provides an inexpensive and high-capacity multilayer optical information recording medium based on a super-resolution technology.

1 Claim, 14 Drawing Sheets

(51) Int. Cl.
*G11B 7/007* (2006.01)
*G11B 7/24085* (2013.01)
*G11B 7/24038* (2013.01)
*G11B 7/24088* (2013.01)
*G11B 7/00* (2006.01)
*G11B 7/26* (2006.01)

(52) U.S. Cl.
CPC ........ *G11B7/24085* (2013.01); *G11B 7/24088* (2013.01); *G11B 7/261* (2013.01); *G11B 2007/0013* (2013.01); *G11B 2007/0133* (2013.01)

(56) References Cited

U.S. PATENT DOCUMENTS

| | | | |
|---|---|---|---|
| 6,628,574 B1* | 9/2003 | Shimazaki et al. | 369/13.09 |
| 6,762,989 B2* | 7/2004 | Hirokane et al. | 369/275.4 |
| 8,189,444 B2* | 5/2012 | Mori et al. | 369/59.22 |
| 8,411,538 B2* | 4/2013 | Yamamoto et al. | 369/47.5 |
| 2005/0254408 A1* | 11/2005 | Hwang et al. | 369/275.1 |
| 2006/0192017 A1* | 8/2006 | Tajima et al. | 235/487 |
| 2007/0009702 A1* | 1/2007 | Hirotsune et al. | 428/64.4 |
| 2008/0285431 A1* | 11/2008 | Minemura et al. | 369/284 |
| 2012/0075983 A1* | 3/2012 | Yamasaki et al. | 369/284 |
| 2013/0114385 A1* | 5/2013 | Nakai et al. | 369/44.11 |

OTHER PUBLICATIONS

Tajima et al., "Optical Information Recording Medium", U.S. Appl. No. 14/183,800, filed Feb. 19, 2014.

Tajima et al., "Optical Information Recording Medium", U.S. Appl. No. 14/328,826, filed Jul. 11, 2014.

* cited by examiner

F I G. 5
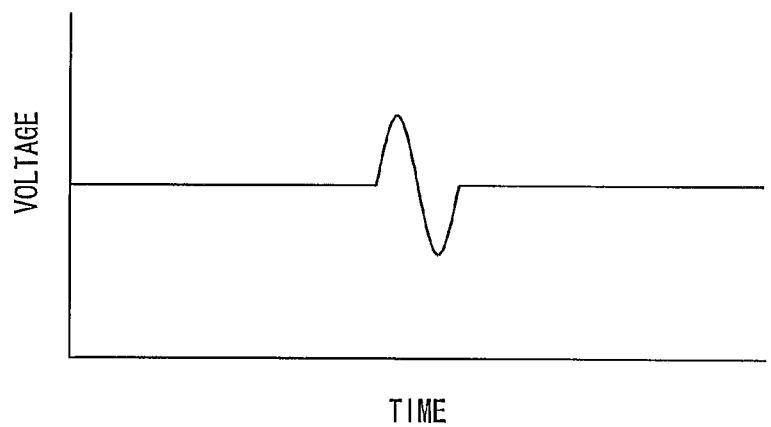
F I G. 6
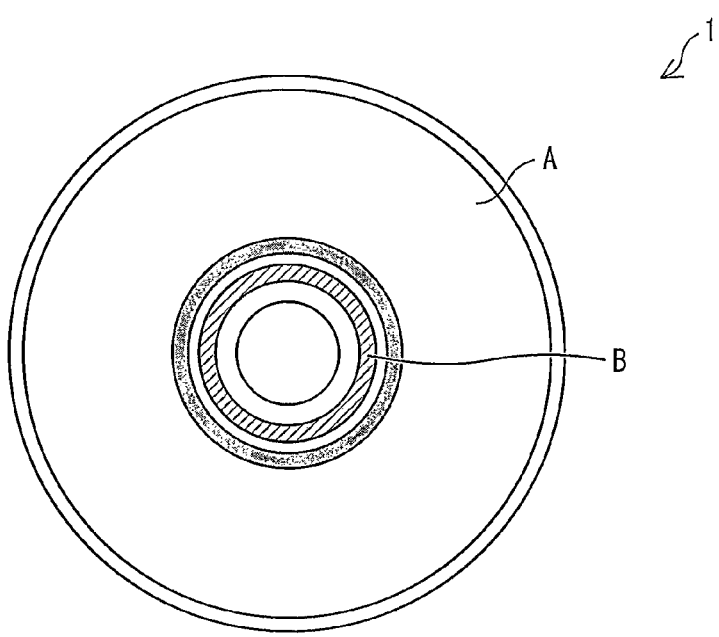

F I G. 1 1
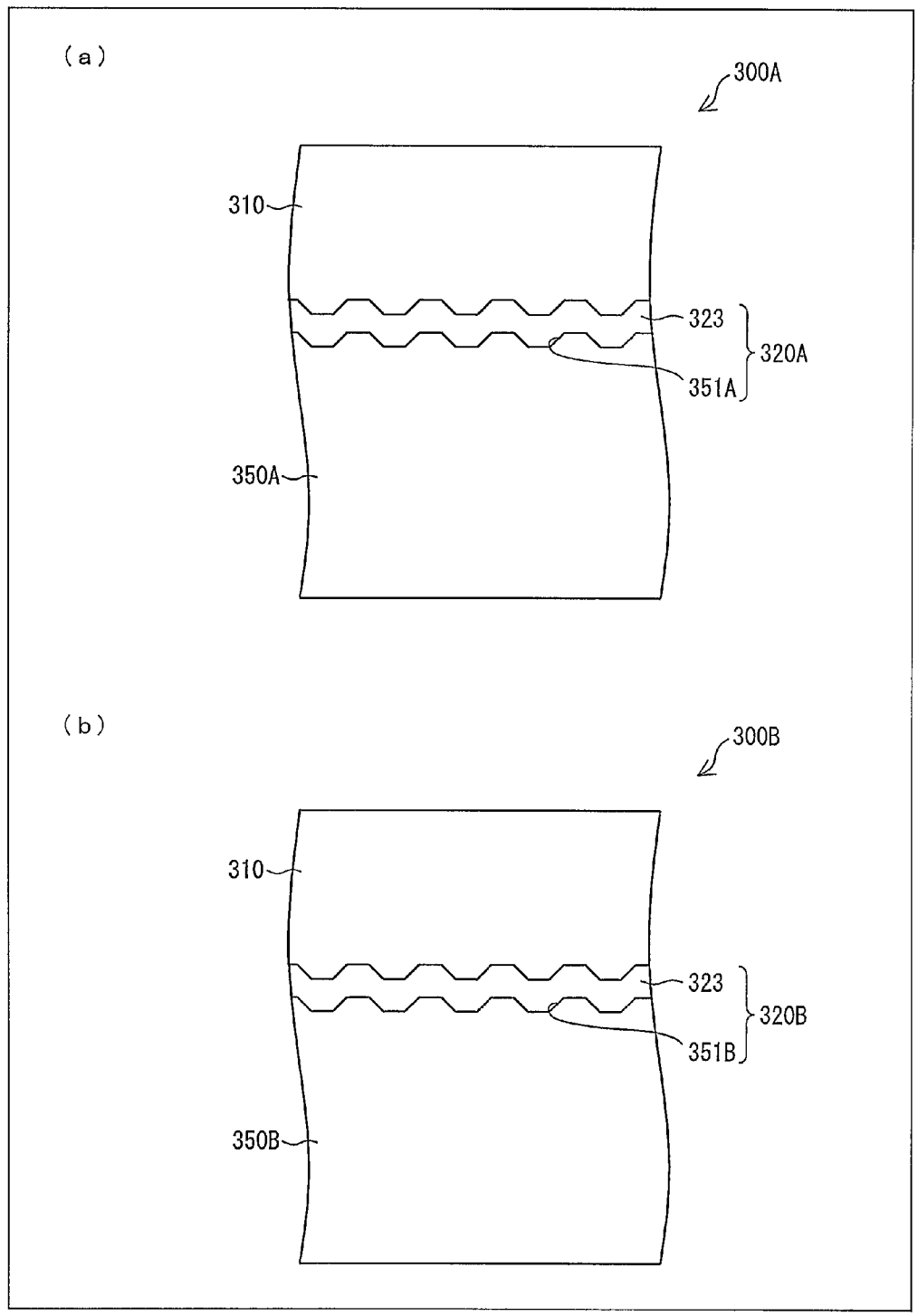

F I G. 1 4

| DENSITY | FILM COMPOSITION | In-Pit SUBSTRATE (DEPRESSION) | On-Pit SUBSTRATE (PROTRUSION) |
|---|---|---|---|
| 25GB | Ta | OPTICAL INFORMATION RECORDING MEDIUM 300A<br>Jitter:6.0% [BOTTOM LEVEL] | OPTICAL INFORMATION RECORDING MEDIUM 300B<br>Jitter:5.5% [BOTTOM LEVEL] |
| 25GB | ZnO/Ta | OPTICAL INFORMATION RECORDING MEDIUM 400A<br>Jitter:7.7% [BOTTOM LEVEL] | OPTICAL INFORMATION RECORDING MEDIUM 400B<br>Jitter:9.7% [BOTTOM LEVEL] |
| 33GB | ZnO/Ta | OPTICAL INFORMATION RECORDING MEDIUM 500A<br>Jitter:10.9% [BOTTOM LEVEL] | OPTICAL INFORMATION RECORDING MEDIUM 500B<br>Jitter:27.5% [BOTTOM LEVEL] |
| 45GB | ZnO/Ta | OPTICAL INFORMATION RECORDING MEDIUM 600A<br>bER:3.6E-5 [BOTTOM LEVEL] | OPTICAL INFORMATION RECORDING MEDIUM 600B<br>UNABLE TO GENERATE CLOCKS |

OPTICAL INFORMATION RECORDING MEDIUM HAVING SUPER-RESOLUTION FILM

TECHNICAL FIELD

The present invention relates to an optical information recording medium for optically recording and reproducing information.

BACKGROUND ART

In recent years, optical information recording media have been required to have larger and larger information recording capacities for processing of a vast amount of information such as images. Solutions to this are a method that involves the use of a super-resolution technology, which is a technology for improving information processing during reproduction, and a method that involves the use of a multilayer optical information recording medium having multiple information recording layers on each of which recording/reproduction can be performed.

The super-resolution technology is a technology for reproducing a signal of a mark length (determined according to a laser wavelength and the numerical aperture of an optical system) that is less than or equal to an optical resolution limit of a reproducing device. Since this makes it possible to perform recording with a smaller mark length, there is an increase in substantive recording density. This is attributed to the fact that it is not a recording technology but a reproduction technology that matters in terms of achieving a higher density.

Of these technologies, the super-resolution technology is described first.

Conventionally, there have been proposed a large number of optical information recording media (hereinafter referred to as "super-resolution media") for reproducing a signal of a mark length that is shorter than an optical system resolution limit of a reproducing device.

A known example of such a technology cannot be utilized for the reproduction of non-rewritable information recorded on a read-only medium with depressions in and protrusions on a substrate, but is compatible with a rewritable optical magnetic recording medium having a recording film made of a magnetic material and is used in reproducing information recorded on the recording film along a magnetization direction (see Patent Literature 1).

Another known example of such a technology is compatible with a read-only medium as well as a rewritable optical recording medium, and provides, on a reproduction light incidence surface of a reflecting film, a mask layer constituted by a thermochromic pigment layer that changes in optical characteristic (transmittance) according to temperature (see Patent Literature 2).

As will be described later, the mask layer is a layer that causes a super-resolution phenomenon, for example, by pseudo-narrowing a laser spot.

Each of these optical information recording media utilizes a temperature distribution attributed to a light intensity distribution in a laser spot formed by a reproduction laser striking a reproduction surface of the optical information recording medium.

More specifically, such an optical magnetic recording medium as that disclosed in Patent Literature 1 has a reproduction layer provided on a recording layer. Moreover, during reproduction, a magnetic field of the recording layer is transferred onto the reproduction layer only in a high-temperature portion within a laser spot. This makes it possible as a result to reproduce a signal of a mark length that is shorter than the optical resolution limit.

Further, in such an optical recording medium as that disclosed in Patent Literature 2, there occurs a temperature or light intensity distribution within a reproduction laser spot on the reproduction layer that is close to the reproduction light incident surface than the reflecting layer, whereby there occurs a distribution of optical characteristics within the laser spot.

For example, in a case where the reproduction layer is made of a material that becomes higher in transmittance as temperature rises, the reproduction layer becomes higher in transmittance in a high-temperature portion, so that a laser spot occurring on the reflecting layer is pseudo-narrowed. This makes it possible as a result to reproduce a signal of a mark length that is shorter than the optical resolution limit.

However, since the super-resolution reproduction technology pseudo-narrows a laser spot, there is a decrease in efficiency in the use of reproduction light (there is of course a decrease in reproduction light). This imposes a limit on the narrowing of a laser spot, and an improvement in recording density is at most approximately twice as high in terms of liner density.

Next, a multilayer optical information recording medium is described.

As disclosed in Patent Literature 3, for example, a multilayer optical information recording medium is structured to have (i) information recording layers such as a first information recording layer and a second information recording layer provided in this order from a reproduction light incident surface and (ii) an intermediate layer, made mainly of resin, which separates the information layers from each other.

In such a structure, an information recording layer other than the information recording layer located furthest from the reproduction light incident surface is a half-transparent layer that transmits reproduction light. This allows reproduction light incident on the reproduction light incident surface to be focused on each information recording layer. Therefore, this multilayer optical information recording medium can be said to be an optical information recording medium whose information recording density can increase as the total number of information recording layers increases.

It should be noted that the most common optical information recording medium that is used for this technology is a single-sided reproduction two-layer DVD-ROM.

However, an increase in the number of layers of a multilayer optical information recording medium makes it difficult to produce the multilayer optical information recording medium, thus making the medium very expensive. The following explains a reason for the difficulty in production with reference to an example of a method for producing a multilayer optical recording medium.

In the production of a multilayer optical information recording medium, e.g., a DVD, which is currently most common, it is only necessary to form a first information recording layer such as a recording film and a reflecting film on a substrate in vacuum, place back the resulting substrate into the atmosphere, and then join on top of the substrate a substrate on which a second information recording layer has been formed in a similar manner, as long as the number of layers is up to two.

However, in a case where the number of layers increases to three, e.g., in a case where the number of layers is three, the first information recording layer formed in vacuum is spin-coated in the atmosphere with an ultraviolet curing resin or the like that is to serve as an intermediate layer. Next, by joining a plastic stamper on top of the ultraviolet curing resin in the atmosphere, curing the ultraviolet curing resin by irradiating it with ultraviolet rays, and then removing the stamper, (i) grooves for tracking and (ii) depressions and protrusions such as pre-pits on the basis of whose sequence information has been recorded are transferred onto a surface of the intermediate layer (called "2P method").

Then, again in vacuum, a second information recording film needs to be formed on the intermediate layer onto which the depressions and protrusions such as the pre-pits have been transferred; furthermore, in the atmosphere, a substrate on which a third information recording layer has been formed needs to be prepared in a similar manner to the substrate provided with the first information recording layer, and be joined on top of the second information recording layer.

In this way, the medium is produced through very complicated steps that require the medium to move between vacuum and the atmosphere.

Further, since each layer has a different film structure for adjusting its reflectance and, during normal mass production, is formed on each medium traveling in one direction through the production line, as many vacuum film-forming apparatuses as information recording layers are required. Moreover, such film-forming apparatuses are very expensive, and are high in running cost among apparatuses that are used in the production of optical information recoding media. Therefore, it has been substantially difficult in terms of cost to increase the number of information recording layers to three or larger.

Despite the above two methods thus proposed as main methods for increasing the density of an optical information recording medium, there have been problems with each of these methods as mentioned above. For this reason, a multilayer super-resolution technology has come to be proposed as a technology which has the advantages of both methods and which can effectively increase the information recording density of an optical information recording medium (Patent Literature 4).

CITATION LIST

Patent Literature 1

Japanese Patent Application Publication, Tokukaihei, No. 8-180486 A (Publication Date: Jul. 12, 1996)

Patent Literature 2

Japanese Patent Application Publication, Tokukai, No. 2001-035012 A (Publication Date: Feb. 9, 2001)

Patent Literature 3

Japanese Patent Application Publication, Tokukai, No. 2000-235733 A (Publication Date: Aug. 29, 2000)

Patent Literature 4

Japanese Patent Application Publication, Tokukai, No. 2006-269040 A (Publication Date: Oct. 5, 2006)

SUMMARY OF INVENTION

Technical Problem

However, as a result of a study, the inventors of the present application found that a problem which does not occur in a multilayer super-resolution read-only optical information recording medium for use in multilayer super-resolution reproduction that is a multilayer (non-super-resolution) read-only optical information recording medium or a multilayer super-resolution read-only optical information recording medium based on a monotone pattern recording method (recording based on marks of the same length) occurs in a multilayer super-resolution read-only optical information recording medium based on a mark edge recording method which is often used in optical information recording media as means for achieving a higher density in terms of signal processing.

The above problem is discussed below.

FIG. 19 is a schematic view showing a configuration of a read-only two-layer DVD-ROM.

As mentioned above, as shown in FIG. 19, a single-sided read-only two-layer DVD-ROM 902, which is most common as a multilayer optical information recording medium, has a second substrate 960, a first information recording layer 920, an intermediate layer 930, a second information recording layer 940, and a substrate 950 stacked in this order from a side close to a reproduction light incident surface, and (i) the recording format of pre-pits (group of pre-pits 931) provided at a surface of contact (interface) between a side of the first information recording medium 920 that is closer to the reproduction light incident surface and the intermediate layer 930 was different from (ii) the recording format of (group of pre-pits 951) provided at a surface of contact between a side of the second information recording medium 940 that is further from the reproduction light incident surface and the substrate 950.

Specifically, from the point of view of making a master, the recording format of the pre-pits in the first information recording layer 920 is such that information is recorded on the first information recording layer 920 in an on-pit format (that forms the pre-pits so that the pre-pits are raised with respect to the reproduction light incident surface), and the recording format of the pre-pits in the second information recording layer 940 is such that information is recorded on the second information recording layer 940 in an in-pit format (that forms the pre-pits so that the pre-pits are depressed with respect to the reproduction light incident surface).

The above problem is a problem that occurs in a case where this structure is used in a multilayer super-resolution optical information recording medium based on the mark edge recording method. This problem will be discussed in detail later. However, in such a structure, the problem takes the form of a remarkable deterioration in reproducing characteristic of one of the information recording layers.

Such a problem does not normally occur in a group of pre-pits (mark position recording method) in a monotone pattern for which the mark edge recording method is not used, as in the case of the groups of pre-pits 931 and 951 shown in (a) and (b) of FIG. 20.

The present invention has been made in view of the foregoing problems, and it is an object of the present invention to provide an inexpensive and high-capacity multilayer optical information recording medium based on a super-resolution technology.

Solution to Problem

In order to solve the foregoing problems, an optical information recording medium of the present invention includes: a light transmittable layer having an incident surface on which reproduction light is incident; two or more information recording layers; a substrate, the light transmittable layer, the information recording layers, and the substrate being stacked in this order from an incident side on which the reproduction light is incident; and an intermediate layer that separates the information recording layers from each other, the two or more information recording layers having information recorded thereon as marks and spaces by a predetermined modulation method, the two or more information recording layers each including (i) a group of pre-pits constituting the marks and the spaces and (ii) a super-resolution film, the marks and the spaces constituted by the group of pre-pits having different lengths, an average length of a smallest mark that is smallest in length among the marks constituted by the group of pre-pits and a smallest space that is smallest in length among the space constituted by the group of pre-pits being less than or equal to a resolution limit of a reproduction optical system for reproducing the information recorded on the information recording layers, the resolution film being a film that enables the reproduction optical system to reproduce information recorded by the group of pre-pits, the group of pre-pits being formed so that a push-pull signal for the reproduction optical system to reproduce the information recorded by the group of pre-pits is negative in polarity.

The group of pre-pits here is constituted by a plurality of pre-pits. The pre-pits mean depressed and protruding shapes provided in and on the substrate and the intermediate layer.

In order to solve the foregoing problems, an optical information recording medium of the present invention includes: a light transmittable layer having an incident surface on which reproduction light is incident; two or more information recording layers; a substrate, the light transmittable layer, the information recording layers, and the substrate being stacked in this order from an incident side on which the reproduction light is incident; and an intermediate layer that separates the information recording layers from each other, the two or more information recording layers having information recorded thereon as marks and spaces by a predetermined modulation method, the two or more information recording layers each including (i) a group of pre-pits constituting the marks and the spaces and (ii) a super-resolution film, the marks and the spaces constituted by the group of pre-pits having different lengths, an average length of a smallest mark that is smallest in length among the marks constituted by the group of pre-pits and a smallest space that is smallest in length among the space constituted by the group of pre-pits being less than or equal to a resolution limit of a reproduction optical system for reproducing the information recorded on the information recording layers, the resolution film being a film that enables the reproduction optical system to reproduce information recorded by the group of pre-pits, the group of pre-pits being in an in-pit format by which the marks are formed more depressed than the spaces with respect to the incident surface on which the reproduction light is incident.

According to the foregoing configuration, the group of pre-pits is in an in-pit format by which the marks are formed more depressed than the spaces with respect to the incident surface on which the reproduction light is incident. This makes it possible to, even if the marks and the spaces are disposed so that the average length of the smallest mark and the smallest space is less than or equal to the resolution limit of the reproduction optical system, prevent deterioration of the reproducing characteristics of information that is obtained by the reproduction optical system reproducing the information recorded on the information recording layers.

Advantageous Effects of Invention

An optical information recording medium of the present invention includes: a light transmittable layer having an incident surface on which reproduction light is incident; two or more information recording layers; a substrate, the light transmittable layer, the information recording layers, and the substrate being stacked in this order from an incident side on which the reproduction light is incident; and an intermediate layer that separates the information recording layers from each other, the two or more information recording layers having information recorded thereon as marks and spaces by a predetermined modulation method, the two or more information recording layers each including (i) a group of pre-pits constituting the marks and the spaces and (ii) a super-resolution film, the marks and the spaces constituted by the group of pre-pits having different lengths, an average length of a smallest mark that is smallest in length among the marks constituted by the group of pre-pits and a smallest space that is smallest in length among the space constituted by the group of pre-pits being less than or equal to a resolution limit of a reproduction optical system for reproducing the information recorded on the information recording layers, the resolution film being a film that enables the reproduction optical system to reproduce information recorded by the group of pre-pits, the group of pre-pits being formed so that a push-pull signal for the reproduction optical system to reproduce the information recorded by the group of pre-pits is negative in polarity.

An optical information recording medium of the present invention includes: a light transmittable layer having an incident surface on which reproduction light is incident; two or more information recording layers; a substrate, the light transmittable layer, the information recording layers, and the substrate being stacked in this order from an incident side on which the reproduction light is incident; and an intermediate layer that separates the information recording layers from each other, the two or more information recording layers having information recorded thereon as marks and spaces by a predetermined modulation method, the two or more information recording layers each including (i) a group of pre-pits constituting the marks and the spaces and (ii) a super-resolution film, the marks and the spaces constituted by the group of pre-pits having different lengths, an average length of a smallest mark that is smallest in length among the marks constituted by the group of pre-pits and a smallest space that is smallest in length among the space constituted by the group of pre-pits being less than or equal to a resolution limit of a reproduction optical system for reproducing the information recorded on the information recording layers, the resolution film being a film that enables the reproduction optical system to reproduce information recorded by the group of pre-pits, the group of pre-pits being in an in-pit format by which the marks are formed more depressed than the spaces with respect to the incident surface on which the reproduction light is incident.

This brings about an effect of making it possible to provide an inexpensive and high-capacity optical information recording medium that is prevented from deteriorating in reproducing characteristic.

BRIEF DESCRIPTION OF DRAWINGS

FIG. 5 shows the appearance of a reproduction optical system push-pull signal for the reproduction machine to reproduce information recorded by the groups of pre-pits, the push-pull signal being positive in polarity.

FIG. 6 is a plan view showing a configuration of the optical information recording medium of the present invention.

FIG. 11 is a set of schematic views (a) and (b), (a) showing a configuration of an optical information recording medium 300A, (b) showing a configuration of an optical information recording medium 300B.

FIG. 14 shows results of measurement of reproduction signals of experimental optical information recording media.

DESCRIPTION OF EMBODIMENTS

Embodiments of the present invention are described in detail below.

(1. Schematic Configuration of an Optical Information Recording Medium 1)

A configuration of optical information recording medium (multilayer super-resolution optical information recording medium) 1 according to an embodiment of the present invention is described.

Figure 1:
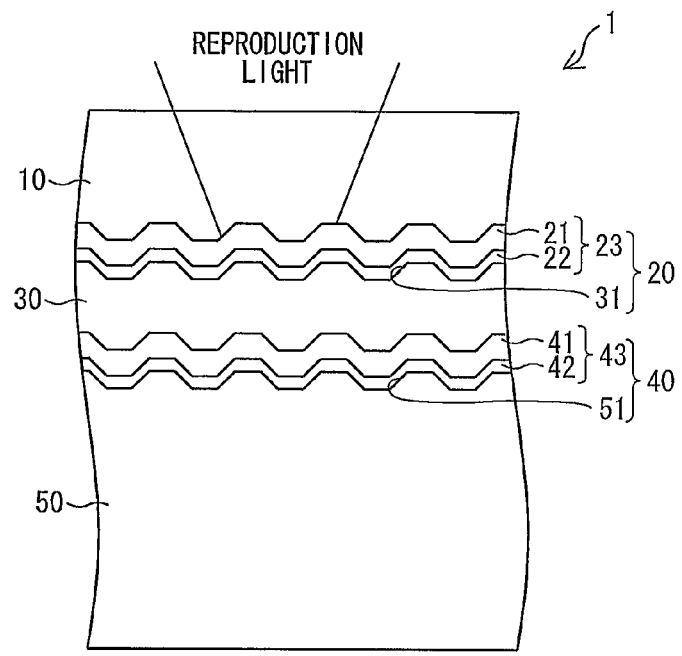
FIG. 1 is a schematic view showing a configuration of an optical information recording medium of the present invention.

FIG. 1 is a schematic view showing a configuration of the optical information recording medium 1.

As shown in FIG. 1, the optical information recording medium 1 includes: a cover layer (light transmittable layer) 10 having an incident surface on which reproduction light is incident; two or more information recording layers, i.e. a first information recording layer (information recording layer) 20 and a second information recording layer (information recording layer) 40; a substrate 50, the light transmittable layer 10, the first and second information recording layers 20 and 40, and the substrate 50 being stacked in this order from an incident side on which the reproduction light is incident; and an intermediate layer 30 that separates the first information recording layer 20 and the second information recording layer 40 from each other.

The optical information recording medium 1 has a multilayer structure constituted by two information recording layers, namely the first information recording layer 20 and the second information recording layer 40. The first information recording layer 20 and the second information recording layer 40 are formed on the intermediate layer 30 provided with a group of pre-pits 31 and the substrate 50 provided with a group of pre-pits 51, respectively, and are read-only (ROM; Read Only Memory) information recording layers from which information can only be read out by reproduction light.

The first information recording layer 20 and the second information recording layer 40 have information recorded thereon in the form of shapes by marks and spaces by a predetermined modulation method, and the marks and the spaces are constituted by the groups of pre-pits 31 and 51.

The following description assumes that of the first and second information recording layers 20 and 40, the second information recording layer 40, on which the substrate 50 is stacked, (i.e., the information recording layer that is further from the reproduction light incident surface) is sometimes referred to as "L0 layer".

(Components of the Optical Information Recording Medium 1)

The components of the optical information recording medium 1 is described in turn with reference to FIG. 1.

The cover layer 10 is located closest to the reproduction light incident side among the layers constituting the optical information recording medium 1. The reproduction light incident surface is a surface of the cover layer 10 that is opposite to that surface of the cover layer 10 which is in contact with the first information recording layer 20.

The cover layer 10 is made, for example, of an ultraviolet curing resin having a thickness of 75 μm (with a refractive index of 1.50 at a reproduction light wavelength of 405 nm). The cover layer 10 needs only be made of a material that exhibits a high transmittance at the reproduction light wavelength. That is, the cover layer 10 may be formed, for example, by a polycarbonate film and a transparent adhesive.

Further, the cover layer 10 may have a surface with an antifouling property (property that does not cause deterioration of reproduction signals or the like from the first and second information recording layers 20 and 40 even in the case of contamination with fingerprints) or an abrasion-resistant property that does not affect reproduction. It should be noted that the antifouling property and the abrasion-resistant property may be attained by providing the surface of the cover layer 10 with a hard coat.

Furthermore, the cover layer 10 may vary in thickness according to an optical system (reproduction optical system) of a reproducing device for the optical information recording medium 1. Specifically, the cover layer 10 may for example be a polycarbonate substrate having a thickness of 0.6 mm.

The first information recording layer 20 is a read-only information recording layer (ROM layer) provided adjacent to the cover layer 10.

The first information recording layer 20 includes (i) the group of pre-pits 31 provided in the intermediate layer 30 put underneath the first information recording layer 20 and (ii) a super-resolution film 23 stacked on the group of pre-pits 31.

The first information recording layer 20 has information recorded thereon in the form of shapes by the group of pre-pits 31 provided in the intermediate layer 30 put underneath the first information recording layer 20. The group of pre-pits 31 provided in the intermediate layer 30 is constituted by a plurality of pre-pits having depressed and protruding shapes.

Stacking of the super-resolution film 23 on the group of pre-pits 31 formed in depressed and protruding shapes in and on the intermediate layer 30 causes the depressions and protrusions of the group of pre-pits 31 to form the super-resolution film 23 into depressed and protruding shapes. In this way, the first information recording layer 20 has information recorded thereon in the form of shapes by the group of pre-pits 31.

As will be mentioned later, the group of pre-pits 31 formed in the intermediate layer 30 is formed to be less than or equal to an optical resolution limit (hereinafter sometimes referred to simply as "resolution limit") of the reproduction optical system.

The super-resolution film 23 is a film that enables the reproduction optical system to reproduce information recorded by the group of pre-pits 31. That is, the super-resolution film 23 is a super-resolution film that enables the reproduction optical system to perform reproduction (super-resolution reproduction) even if the average length of the smallest mark and the smallest space in the group of pre-pits 31 is less than or equal to the resolution limit.

The first information recording layer 20 is a layer, obtained by stacking the super-resolution film 23 on the group of pre-pits 31, which enables the reproduction optical system to reproduce information recorded by the group of pre-pits 31.

The super-resolution film 23 is for example a film which allows a spot diameter of incident reproduction light to be pseudo-narrowed by a temperature distribution of the reproduction light and which allows information recorded by the group of pre-pits 31 to be reproduced by a phenomenon occurring in a super-resolution reproduction technology, such as a super ROM, whose principle per se has yet to be explained.

The super-resolution film 23 is constituted by two thin films stacked by sputtering or the like. Specifically, these two thin films are a reproduction film 21 (made of zinc oxide with a thickness of approximately 55 nm) and a reflecting film 22 (made of Ti with a thickness of approximately 6 nm), the reproduction film 21 and the reflecting film 22 being stacked in this order from the reproduction light incident side.

The material for the super-resolution film 23, the thickness of the super-resolution film 23, and the number of films by which the super-resolution film 23 is constituted are not to be limited to those described above. The super-resolution film 23 needs only be a super-resolution film which functions as a layer that enables super-resolution reproduction and which enables reproduction of information recorded by the group of pre-pits 31 provided in the intermediate layer 30, which will described later.

Further, the term "reproduction film" means a film that enables super-resolution reproduction by being combined with a semi-transparent film or a reflecting film, and the term "semi-transparent film" means a film that transmits reproduction light and plays a role of a reflecting film.

The intermediate layer 30 is made, for example, of an ultraviolet curing resin having a thickness of 25 μm (with a refractive index of 1.50 at the reproduction light wavelength). The material for the intermediate layer 30 is not to be limited to such a material, but needs only be a material that exhibits a high transmittance at the reproduction light wavelength. Further, the thickness of the intermediate layer 30 is not limited to such a thickness, either, but needs only be an appropriate thickness that allows separation of the information recording layers (here, the first and second information recording layers 20 and 40) from each other and does not cause a problem of interlayer crosstalk.

The term "interlayer crosstalk" here means noise generated from an information recording layer other than an information recording layer whose information is being reproduced. Alternatively, the intermediate layer 30 may have a multilayer structure.

Provided in that surface of the intermediate layer 30 which is in contact with the super-resolution film 23 is the group of pre-pits 31 formed by a 2P method (photo polymerization method) in depressed and protruding shapes formed in accordance with information recorded as shaped on the first information recording layer 20. The group of pre-pits 31 is formed in an in-pit format by which pre-pits are formed in depressed shapes with respect to the reproduction light incident surface.

The term "2P method" here means a method by which depressions in and protrusions on (pre-pits in) a master are transferred onto a flap plate by (i) filling a space between the flat plate and the master with an ultraviolet curing resin, (ii) curing the ultraviolet curing resin by irradiating it with ultraviolet rays, and (iii) removing the mater.

A configuration of the group of pre-pits 31 will be described later.

The second information recording layer 40 is a read-only information recording layer (ROM layer) provided in a position furthest from the cover layer 10.

The second information recording layer 40 includes (i) the group of pre-pits 51 provided in the substrate 50 put underneath the second information recording layer 40 and (ii) a super-resolution film 43 stacked on the group of pre-pits 51.

The second information recording layer 40 has information recorded thereon in the form of shapes by the group of pre-pits 51 provided in the substrate 50 put underneath the second information recording layer 40. The group of pre-pits 51 provided in the substrate 50 is constituted by a plurality of pre-pits having depressed and protruding shapes.

Stacking of the super-resolution film 43 on the group of pre-pits 51 formed in depressed and protruding shapes in and on the substrate 50 causes the depressions and protrusions of the group of pre-pits 51 to form the super-resolution film 43 into depressed and protruding shapes. In this way, the second information recording layer 40 has information recorded thereon in the form of shapes by the group of pre-pits 51.

As will be mentioned later, the group of pre-pits 51 formed in the substrate 50 is formed to be less than or equal to the optical resolution limit of the reproduction optical system. The super-resolution film 43 is a film that enables the reproduction optical system to reproduce information recorded by the group of pre-pits 51. That is, the super-resolution film 43 is a super-resolution film that enables the reproduction optical system to perform reproduction even if the average length of the smallest mark and the smallest space in the group of pre-pits 51 is less than or equal to the resolution limit.

The second information recording layer 40 is a layer, obtained by stacking the super-resolution film 43 on the group of pre-pits 51, which enables the reproduction optical system to reproduce information recorded by the group of pre-pits 51.

The super-resolution film 43 is for example a film which allows a spot diameter of incident reproduction light to be pseudo-narrowed by a temperature distribution of the reproduction light and which allows information recorded by the group of pre-pits 51 to be reproduced by a phenomenon occurring in a super-resolution reproduction technology, such as a super ROM, whose principle per se has yet to be explained.

The super-resolution film 43 is constituted by two thin films stacked by sputtering or the like. Specifically, these two thin films are a reproduction film 41 (made of zinc oxide with a thickness of approximately 65 nm) and a reflecting film 42 (made of Ta with a thickness of 7 nm), the reproduction film 41 and the reflecting film 42 being stacked in this order from the reproduction light incident side.

The material for the super-resolution film 43, the thickness of the super-resolution film 43, and the number of films by which the super-resolution film 43 is constituted are not to be limited to those described above. The super-resolution film 43 needs only be a super-resolution film which functions as a layer that enables super-resolution reproduction and which enables reproduction of information recorded by the group of pre-pits 51 provided in the substrate 50, which will described later.

The substrate 50 is a disk-shaped substrate having a group of pre-pits on which information has been recorded in a similar in-pit format to the intermediate layer 30. The substrate 50 is for example a polycarbonate substrate having a diameter of 120 mm and a thickness of 1.1 mm.

The material for the substrate 50 and the thickness of the substrate 50 are not to be limited to those described above, as long as the substrate 50 has the group of pre-pits 51 provided in a surface (light incident surface) thereof and has such a predetermined degree of strength as to be usable as a substrate. Specifically, the substrate 50 may be made of polyolefin resin, metal, or the like. Furthermore, the substrate 50 may have a multilayer structure.

In this way, the optical information recording medium 1 includes a plurality of information recording layer, namely the first information recording layer 20 and the second information recording layer 40.

Again, the first information recording layer 20 includes (i) the group of pre-pits 31, in which the average length of the smallest mark and the smallest space is less than or equal to the resolution limit of the reproduction optical system and (ii) the super-resolution film 23 stacked on the group of pre-pits 31.

Similarly, the second information recording layer 40 includes (i) the group of pre-pits 51, in which the average length of the smallest mark and the smallest space is less than or equal to the resolution limit of the reproduction optical system and (ii) the super-resolution film 43 stacked on the group of pre-pits 51. In this way, the optical information recording medium 1 is configured as a multilayer super-resolution optical information recording medium.

(Modification of the Optical Information Recording Medium 1)

Next, a modification of the optical information recording medium 1 is described with reference to FIG. 18.

The optical information recording medium 1 needs only be a multilayer super-resolution optical information recording medium including two or more information recording layers each of which includes (i) a group of pre-pits in which the average length of the smallest mark and the smallest space is less than or equal to the resolution limit of a reproduction optical system and (ii) a super-resolution film that is a film that enable the reproduction optical system to reproduce information recorded by the group of pre-pits.

That is, in a case where the groups of pre-pits 31 and are each made of a metal material having a high reflectance, the super-resolution films 23 and 43, which are stacked on the groups of pre-pits 31 and 51 respectively, may each be constituted not by two layers but by a single layer.

An example of a configuration of such a multilayer super-resolution optical information recording medium is described with reference to FIG. 18.

Figure 18:
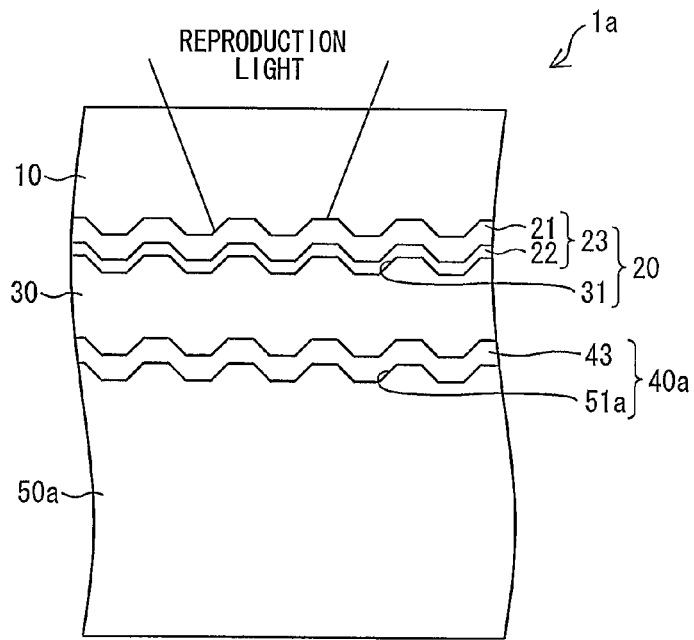
FIG. 18 shows a configuration of an optical information recording medium whose second information recording layer has a super-resolution film constituted by a single layer.
Figure 19:
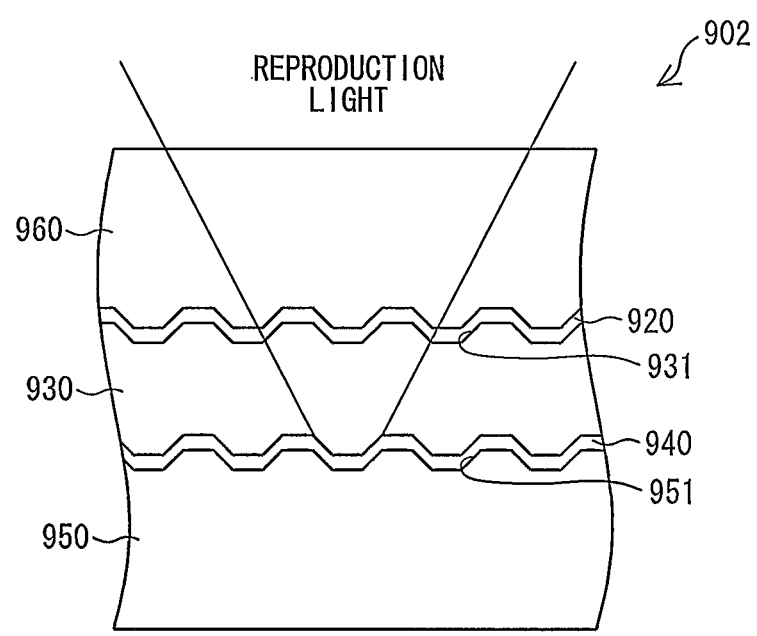
FIG. 19 is a schematic view showing a configuration of a conventional read-only two-layer DVD-ROM.
Figure 20:
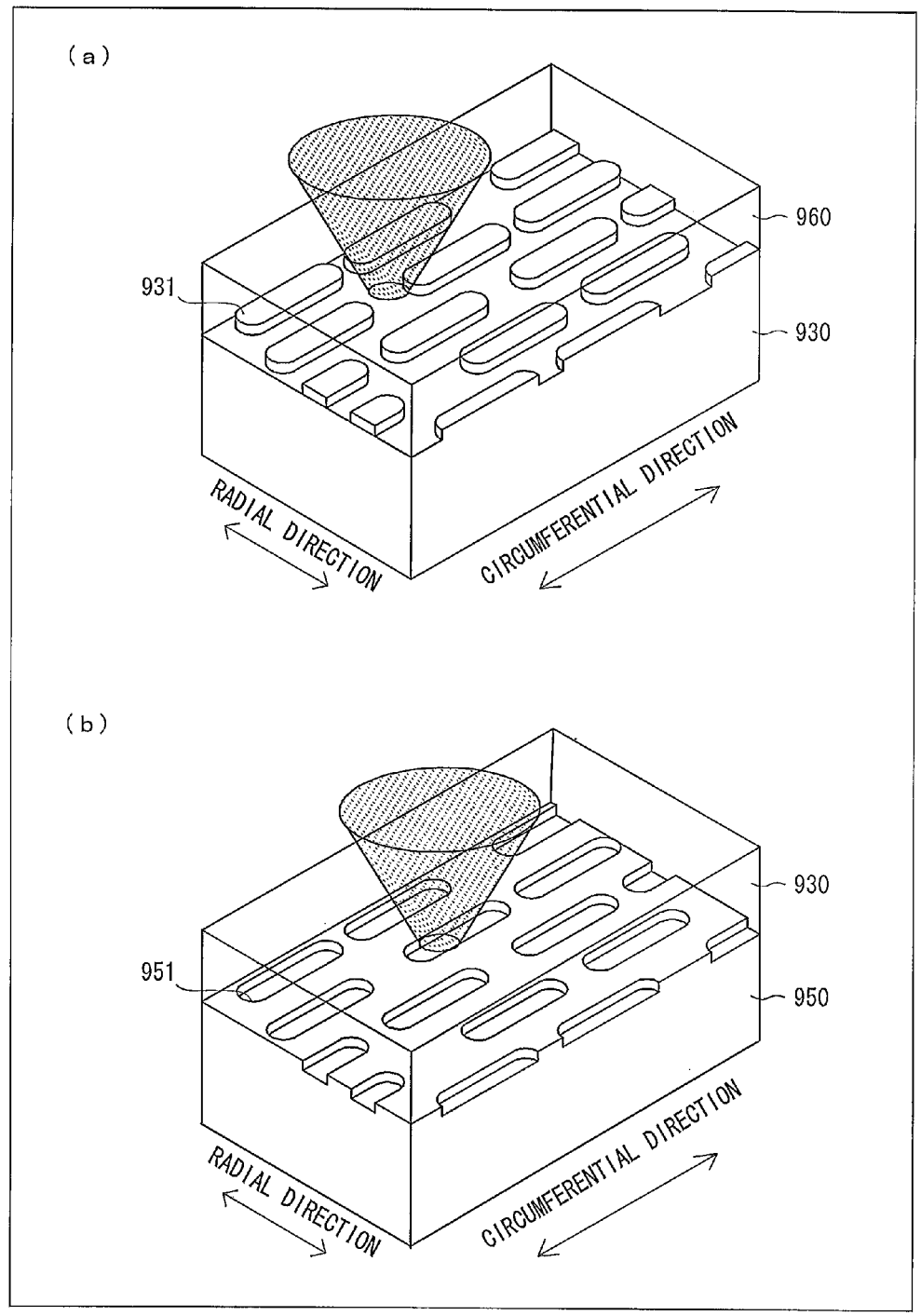
FIG. 20 is a set of enlarged perspective views (a) and (b), (a) showing a configuration of a group of pre-pits in a monotone on-pit format, (b) showing a configuration of a group of pre-pits in a monotone in-pit format.

FIG. 18 is a schematic view showing a configuration of an optical information recording medium including a plurality of information recording layers a second information recording layer 40a of which has a super-resolution film 43 constituted by a single layer.

An optical information recording medium 1a includes a cover layer 10, a first information recoding layer 20, an intermediate layer 30, a second information recording layer 40a, and a substrate 50, in this order from an incident side on which reproduction light is incident.

The second information recording layer 40a includes (i) a group of pre-pits 51a and (ii) a super-resolution film 43 stacked on the group of pre-pits 51a.

The super-resolution film 43 is made of zinc oxide having a thickness of approximately 65 nm, as with the reproduction film 41.

The substrate 50a is made of a metal material having a high reflectance. Examples of such a metal material include Ta and the like. The substrate 50a has the group of pre-pits 51a formed in a surface thereof on which the super-resolution film 43 is stacked. The group of pre-pits 51a formed in the substrate 50a is made of the same metal material, such as Ta, as the substrate 50a. This allows the group of pre-pits 51a to also function as a reflecting film.

It should be noted that the lengths of marks and spaces constituted by the group of pre-pits 51 are the same as those of the group of pre-pits 51.

The optical information recording medium 1a, which is a multilayer super-resolution optical information recording medium, may be configured in this way.

In the optical information recording medium 1a, the second information recording layer 40a includes the group of pre-pits 51a and the super-resolution film 43, with the group of pre-pits 51a made of a metal material having a high reflectance and the super-resolution film 43 constituted by a single layer.

Since the group of pre-pits 51a is made of a metal material having a high reflectance, the super-resolution film 41 does not need to be constituted by a plurality of layers stacked on top of each other. This makes it possible to reduce manufacturing costs as compared the case of a super-resolution film stacked on the group of pre-pits 51a of the optical information recording medium 1.

(Configuration of the Groups of Pre-Pits)

Next, configurations of the groups of pre-pits 31 and 51 provided in the intermediate layer 30 and the substrate 50 respectively are described with reference to FIGS. 2 through 6.

Figure 2:
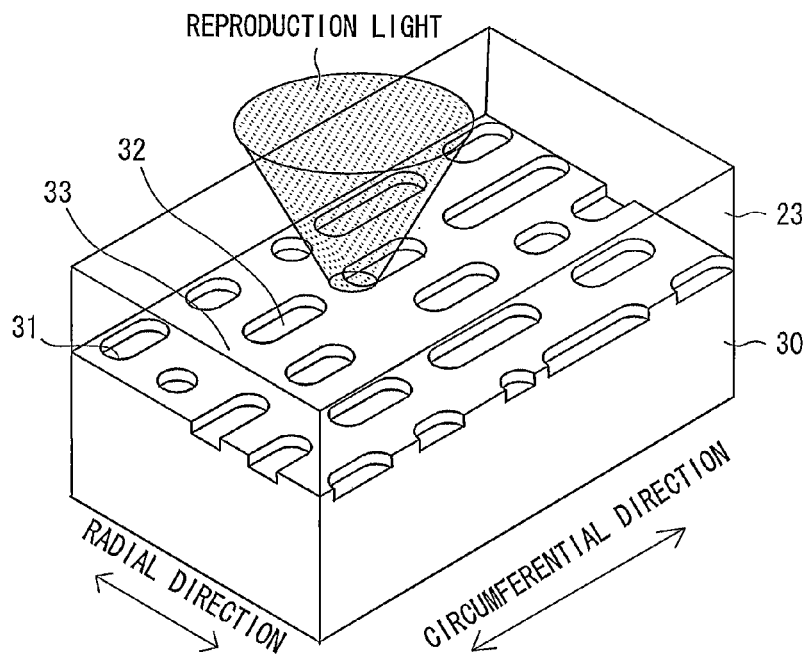
FIG. 2 is an enlarged perspective view showing a configuration of a group of pre-pits provided in an intermediate layer of the optical information recording medium of the present invention.
Figure 3:
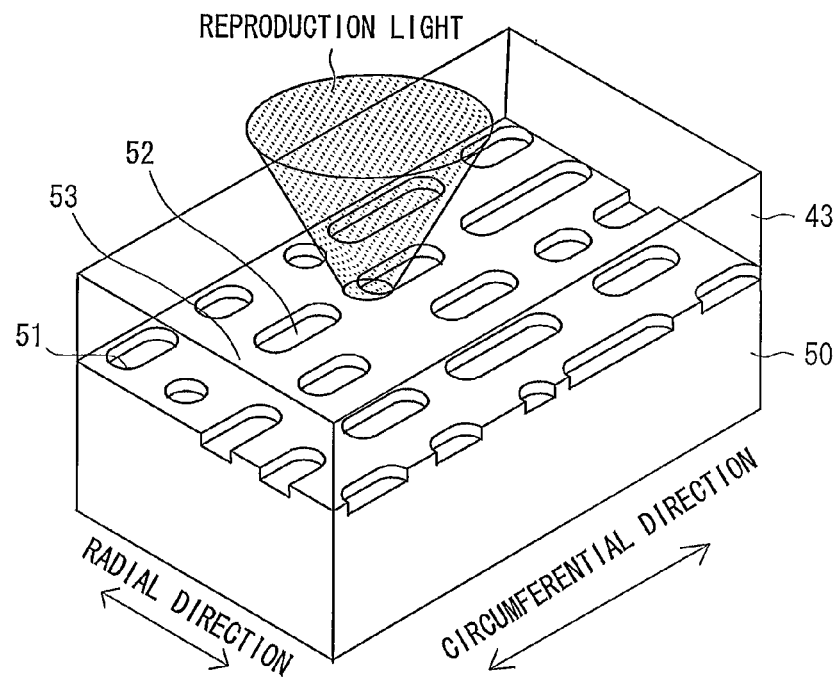
FIG. 3 is an enlarged perspective view showing a configuration of a group of pre-pits provided in a substrate of the optical information recording medium of the present invention.

FIG. 2 is a perspective view showing a configuration of pre-pits provided in the intermediate layer 30. FIG. 3 is a perspective view showing a configuration of pre-pits provided in the substrate 50.

The groups of pre-pits 31 and 51 are arrangements of a plurality of pre-pits constituted by depressions and protrusions formed in accordance with information recorded as shaped on the first and second information recording layers 20 and 40. The group of pre-pits 31 includes marks 32 and spaces 33, and the group of pre-pits 51 includes marks 52 and spaces 53. Each of the marks 32 and 52 is a reflecting surface of a pre-pit which reflecting surface reflects reproduction light, and each of the spaces 33 and 53 is a reflecting surface between pre-pits which reflecting surface reflects reproduction light. The groups of pre-pits 31 and 51 record information on the first and second information recording layers 20 and 40, respectively, in accordance with a predetermined modulation method, e.g., a 1-7RLL modulation method.

The marks 32 and 52 constituted by the groups of pre-pits 31 and 51 have different lengths. By thus causing the marks 32 and 52 to have different lengths, an improvement in density at which information is recorded can be achieved as compared with a so-called monotone pattern recording method where marks have the same length.

In the marks 32 and 52 thus configured to have different lengths, information is recorded by a mark edge recording method, for example, in accordance with the 1-7RLL modulation method. The mark edge recording method is a method by which information ("1" (high) or "0" (low) is read by reading an edge portion of each of the marks 32 and 52 (boundary portion of each of the marks 32 and 52 with its adjacent space 33 or 53).

Use of the mark edge recording method makes it possible to improve the volume of information to be recorded, as compared with a mark position recording method used as the monotone pattern recording method.

The groups of pre-pits 31 and 51 are formed such that the average length of the smallest mark that is smallest in length among the marks 32(52) constituted by the groups of pre-pits 31(51) and the smallest space that is smallest in length among the spaces 33(53) constituted by the groups of pre-pits 31(51) is less than or equal to the resolution limit of a reproduction optical system for reproducing the information recorded on the information recording layers (the first and second information recording layers 20 and 40).

This makes it possible to improve the density at which the marks 32 and 52 and the spaces 33 and 53 are disposed, thus making it possible to record a large volume of information on each of the first and second information recording layers 20 and 40.

The term "the average length of the smallest mark and the smallest space" here means a length that can be calculated from a predetermined modulation method and the density of information recorded on the first information recording layer 20 or the second information recording layer 40.

Structurally, for example, in the case of the 1-7RLL modulation method, the average length is an average length of the smallest mark, 2T mark length, and the smallest space, 2T space length.

Specifically, in a case where the reproduction optical system is based on BD (Blu-ray Disc), an average length of the smallest mark, 2T mark length, and the smallest space, 2T space length, in the 1-7RLL modulation method is 93 nm, for example.

In addition, as described above, each of the super-resolution films 23 and 43 is configured as a super-resolution film that enables the reproduction optical system to perform reproduction even if the groups of pre-pits 31 and 51 are formed to be less than or equal to the resolution limit of the reproduction optical system. This allows the reproduction optical system to reproduce information recorded by the groups of pre-pits 31 and 51 (i.e. information recorded by the marks 32 and 52 and the spaces 33 and 53).

In this way, the optical information recording medium 1 is configured as a multilayer super-resolution optical information recording medium.

Specifically, the optical information recording medium 1 is configured such that two information recording layers, namely the first and second information recording layers 20 and 40, are disposed, and that the super-films 23 and 43 are stacked on the groups of pre-pits 31 and 51, respectively, in each of which the average length of the smallest mark and the smallest space is less than or equal to the resolution limit of the reproduction optical system.

By thus configuring the optical information recording medium 1 as a multilayer super-resolution optical information recording medium, it is made possible to prevent the number of information recording layers to be stacked from further increasing to three layers, four layers, and more for the purpose of increasing a capacity for recording information on the information recording layers. Thus, by configuring the optical information recording medium 1 as a multilayer super-resolution optical information recording medium, it is made possible to increase a capacity for storing information and to prevent a manufacturing cost increase associated with an increase in the number of information recording layers to be stacked.

Further, the groups of pre-pits 31 and 51 are formed in an in-pit format by which the marks 32 and 52 are formed more depressed than the spaces 33 and 53 with respect to the incident surface on which the reproduction light is incident. A push-pull signal for the reproduction optical system to reproduce the information recorded by the groups of pre-pits 31 and 51 in the in-pit format is negative in polarity.

In other words, the groups of pre-pits 31 and 51 are formed such that a push-pull signal for the reproduction optical system to reproduce the information recorded by the groups of pre-pits 31 and 51 is negative in polarity.

Figure 4:
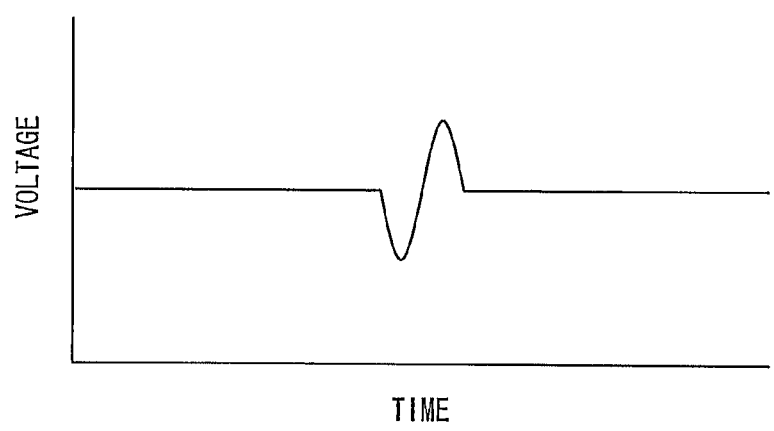
FIG. 4 shows the appearance of a reproduction optical system push-pull signal for a reproduction machine to reproduce information recorded by the groups of pre-pits, the push-pull signal being negative in polarity.

FIG. 4 shows the appearance of a reproduction optical system push-pull signal for a reproduction machine to reproduce information recorded by the groups of pre-pits, the push-pull signal being negative in polarity.

FIG. 5 shows the appearance of a reproduction optical system push-pull signal for the reproduction machine to reproduce information recorded by the groups of pre-pits, the push-pull signal being positive in polarity.

The phrase "push-pull signal being negative in polarity" means that in a reproduction machine where a push-pull signal is calculated by subtracting a voltage obtained by one light-receiving section, for receiving a reproduction signal, disposed closer to the center of the optical information recording medium 1 from a voltage obtained by another light-receiving section, for receiving a reproduction signal, disposed closer to the outer edge of the optical information recording medium 1, the push-pull signal takes on a level of 0, a negative level, a level of 0, a positive level, and a level of 0 in this order, as shown in FIG. 4, when a jump to an inner track occurs from a track in which information recorded by pre-pits is reproduced.

At a time when the reproduction machine reproduces information recorded by the groups of pre-pits 31 and 51 formed in the in-pit format on the optical information recording medium 1, the polarity of a reproduction optical system push-pull signal is negative, as shown in FIG. 4.

At a time when the reproduction machine reproduces information recorded by groups of pre-pits formed in an on-pit format, a push-pull signal whose polarity is positive is obtained to take on a level of 0, a positive level, a level of 0, a negative level, a level of 0 in this order, as shown in FIG. 5.

Even with the marks and the spaces disposed so that the average length of the smallest mark and the smallest space both of which are constituted by the groups of pre-pits 31 and 51 is less than or equal to the resolution limit of the reproduction optical system, it is possible to prevent deterioration in reproducing characteristic of information that is obtained by the reproduction optical system reproducing information recorded on each of the first and second information recording layers 20 and 40.

With the optical information recording medium 1, it is therefore possible to realize a high-capacity and inexpensive optical information recording medium that is prevented from deteriorating in reproducing characteristic.

That is, the configuration of the optical information recording medium 1 makes it possible to impart satisfactory reproducing characteristics to all of the information recording layers formed in the optical information recording medium 1, i.e., to the first information recording layer 20 and the second information recording layer 40.

Furthermore, it is preferable that the average length of the smallest mark and the smallest space in the group of pre-pits 31 (51) be less than or equal to $\lambda/(5.76 \text{ NA})$, where $\lambda$ is the reproduction light wavelength of a reproduction optical system that reproduced information recorded on the optical information recording medium 1 and NA is the numerical aperture of the reproduction optical system.

In a case where the average length of the smallest mark and the smallest space in the group of pre-pits is greater than $\lambda/(5.76 \text{ NA})$, the generation of clocks for reproducing information recorded on the information recording layer is possible even if the recording format of the group of pre-pits is an on-pit format, as will be mentioned later.

This makes it possible to obtain necessary reproducing characteristics by complementing reproducing characteristics even if the reproducing characteristics deteriorate. That is, when the average length of the smallest mark and the smallest space in the group of pre-pits is less than or equal to $\lambda/(5.76 \text{ NA})$, there is a remarkable difference in reproducing characteristic depending on the recording format (in-pit recording format or on-pit recording format) of the group of pre-pits.

In this case, there is a more remarkable difference depending on the recording format of pits, and a further increase in capacity can be achieved by forming pits in an in-pit format.

That is, in the case of an optical information recording medium produced in a configuration different from the optical information recording medium 1, it is extremely difficult to correct reproducing characteristics of an information recording layer when the average length of the smallest mark and the smallest space in a group of pre-pits is less than $\lambda/(5.76 \text{ NA})$.

On the contrary, the optical information recording medium 1 is configured such that each of the groups of pre-pits 31 and 51 is formed in an in-pit format. Therefore, even when the average length of the smallest mark and the smallest space in each of the groups of pre-pits 31 and 51 is less than $\lambda/(5.76 \text{ NA})$, it is possible to eliminate the need for correction of the reproducing characteristics of information obtained by reproducing information recorded on the first and second information recording layers 20 and 40, and to thus prevent deterioration in reproducing characteristic and obtain satisfactory reproducing characteristics.

(Planar Configuration of the Optical Information Recording Medium 1)

Next, a planar configuration of the optical information recording medium 1 will be described with reference to FIGS. 6 and 7.

FIG. 6 is a plan view schematically showing a configuration of the optical information recording medium 1.

Figure 7:
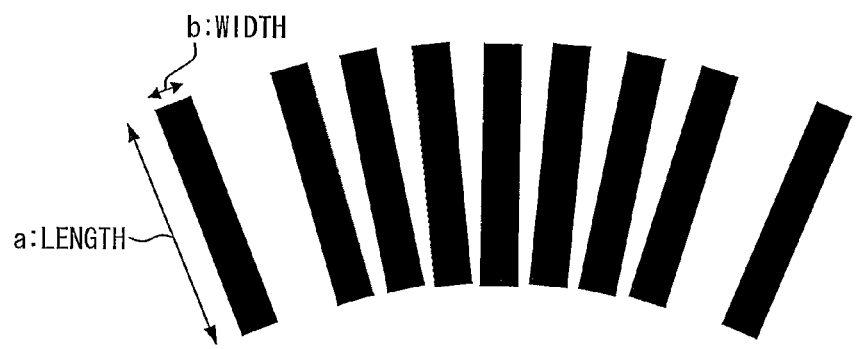
FIG. 7 is a schematic view showing an example of a BCA disposed in the optical information recording medium of the present invention.

FIG. 7 is a schematic view showing an example of a BCA disposed in the optical information recording medium 1. In FIG. 7, the arrow a represents length, and the arrow b represents width.

As shown in FIG. 6, the optical information recording medium 1 includes: a region A (content recording region), which is a region in which to perform general information recording and reproduction; and a region B, which is a region in which to record and reproduce a BCA (burst cutting area).

The region A is a region in which to record reproduction content information and the like for a user to use. The region A is an information recording region that requires tracking for reproducing recorded information.

The region B is a BCA recording region for recording BCA, and is provided closer to the center of the optical information recording medium 1.

As shown in FIG. 7, the BCA takes the form of a barcode.

The BCA is recorded in the second information recording layer 40 by a recording method that renders the BCA more easily detectable than the information recorded as the marks 32 and 52 and the spaces 33 and 53 (i.e. the groups of pre-pits 31 and 51) on the first and second information recording layers 20 and 40.

The BCA contains the following pieces of information: (i) disk-type identification information, which is information for identifying a disk type (medium type such as DVD or BD) of the optical information recording medium 1; and (ii) individual identification information, which is information for individually identifying the optical information recording medium 1.

Furthermore, the disk-type identification information also contains information indicating that the first information recording layer 20 and the second information recording layer 40 are layers configured to allow a reproduction optical system to reproduce information recorded by the groups of pre-pits 31 and 51. That is, the disk-type identification information also contains information indicating that the optical information recording medium 1 is a multilayer super-resolution optical information recording medium.

The BCA is formed in a L0 layer (second information recording layer 40), which is an information recording layer provided in a position furthest from the cover layer 10. That is, in the optical information recording medium 1, the disk-type identification information and the individual identification information are recorded on the L0 layer, which is an information recording layer provided at a position furthest from the cover layer 10.

This makes it possible to preset, in a reproducing device that reproduces the disk-type identification information and the individual identification information, which of a plurality of information recording layers, i.e. the first information recording layer 20 and the second information recording layer 40 has the disk-type identification information and the individual identification information recorded thereon.

The above configuration makes it possible to reduce the amount of time required for causing the reproducing device to identify the second information recording layer 40 as a layer where the disk-type identification information and the individual identification information are recorded, among a plurality of information recording layers, i.e. the first information recording layer 20 and the second information recording layer 40. Furthermore, the above configuration facilitates use of optical information recording media of various disk types by a single reproducing device.

It should be noted that the BCA is formed in stripes having widths in units of 10 µm in the second information recording layer 40, which is the L0 layer, by irradiating the second information recording layer 40 with pulse laser light during the manufacture of the optical information recording medium 1.

In this way, the BCA is formed on the second information recording layer 40. Since the BCA takes the form of stripes having widths in units of 10 µm and lengths in units of 100 µm to several hundreds micrometers (in units of mm), the BCA is larger than the groups of pre-pits 31 and 51 (the marks 32 and 52 and the spaces 33 and 53) respectively formed in the first information recording layer 20 and the second information recording layer 40.

This allows a reproducing device which reproduces the BCA to read the BCA without tracking even if focusing of the reproducing device is slightly off. Thus, the BCA is formed on the second information recording layer 40 by a recording method that renders the BCA more easily detectable than a recording method for recording information as the marks 32 and 52 and the spaces 33 and 53.

Further, use of a dedicated pulse laser light irradiation device makes it possible to comparatively easily form a BCA as disk-type identification information and an individual identification number in the optical information recording medium 1.

Further, as described above, the marks 32 and 52 respectively formed on the first and second information recording layers 20 and 40 of the optical information recording medium 1, which is a multilayer super-resolution optical information recording medium, are formed at a such high density that the average length of the smallest mark and the smallest space is less than or equal to the resolution limit of the reproduction optical system.

In the case of reproduction of information recorded at a high density, like the information recorded on the first and second information recording layers 20 and 40, it is necessary to make reproduction laser power (intensity of the reproduction light) larger than in the case of reproduction of information recorded on an optical information recording medium (e.g. non-multilayer super-resolution optical information recording medium in which the average length of the smallest mark and the smallest space is greater than the resolution limit of a reproduction optical system) having an information recording layer formed at a lower density than the first and second information recording layers 20 and 40.

For this reason, an attempt to reproduce information on the non-multilayer super-resolution optical information recording medium by reproduction laser power by which to reproduce information on the optical information recording medium 1 may result in destruction of the non-multilayer super-resolution optical information recording medium.

However, with an arrangement in which the disk-type identification information is recorded on the second information recording layer 40 by a recording method that renders information, like the BCA, more easily detectable than a recording method for recording information as the marks 32 and 52 and the spaces 33 and 53, it is possible to determine whether or not the optical information recording medium is a multilayer super-resolution optical information recording medium by confirming disk-type identification information before increasing reproduction laser power by which to reproduce information recorded as the marks 32 and 52 and the spaces 33 and 53.

This prevents information on a non-multilayer super-resolution optical information recording medium from being mistakenly reproduced by reproduction laser power increased for reproduction of information recorded on the first information recording layer 20 as the marks 32 and the spaces 33 and information recorded on the second information recording layer 40 as the marks 52 and the spaces 53. This makes it possible to provide a highly versatile optical information recording medium 1.

Further, as shown in FIG. 6, in the optical information recording medium 1, the region B is located closer to the center of the optical information recording medium 1 than the region A. That is, the BCA is located in the vicinity of the center of the optical information recording medium 1. Thus, the disk-type identification information and the individual identification information are recorded on a radial position located closer to the center of the optical information recording medium 1 than the region A, which requires tracking for information reproduction.

Here, in a case where the BCA contains the disk-type identification information and the individual identification number, a region having a predetermined length along the radial direction and corresponding to a single circle along the circumferential direction is needed as a region in which to record the BCA, so that the disk-type identification information and the individual identification information, both of which are included in the BCA, can be reproduced even if the radial direction position of reproduction light emitted from the reproduction optical system is slightly off.

Securement of such a region in which to record the disk-type identification information and the individual identification information results in a decrease in area of the information recording region (region A) in which to store other information.

However, since the radial position of the region B on which the disk-type identification information and the individual identification information are recorded is located closer to the center of the optical information recording medium 1 than the region A, the decline in recording capacity of the region A can be curbed as compared with a case where the radial position of the region B is located further from the center of the optical information recording medium 1 than the region A.

Furthermore, it is possible to decrease a volume of the BCA to be recorded on the optical information recording medium 1, as compared with a case where the BCA is located in the vicinity of the outer edge of the optical information recording medium 1. Therefore, it is possible to reduce the amount of time required for recording the BCA on the optical information recording medium 1.

(2. Problems that Occur in the Case of a Combination of Conventional Arts)

The following explains problems that occur in the case of application of a super-resolution technology to a conventional multilayer read-only information recording medium.

Explained first is a difference in reproducing characteristic that arises from a difference in recording format of pre-pits and configuration of an information recording layer of an optical information recording medium based on a mark edge recording method. Explained next is the reproducing characteristic of an optical information recording medium based not on the mark edge recording method but on a monotone recording method (equivalent to mark position recording method).

(2-1. Multilayer Super-Resolution Optical Information Recording Medium Based on the Mark Edge Recording Method)

(Experiment for Evaluating Reproduction Signals from a Single-Layer Information Recording Layer and a Multilayer Information Recording Layer)

Figure 8:
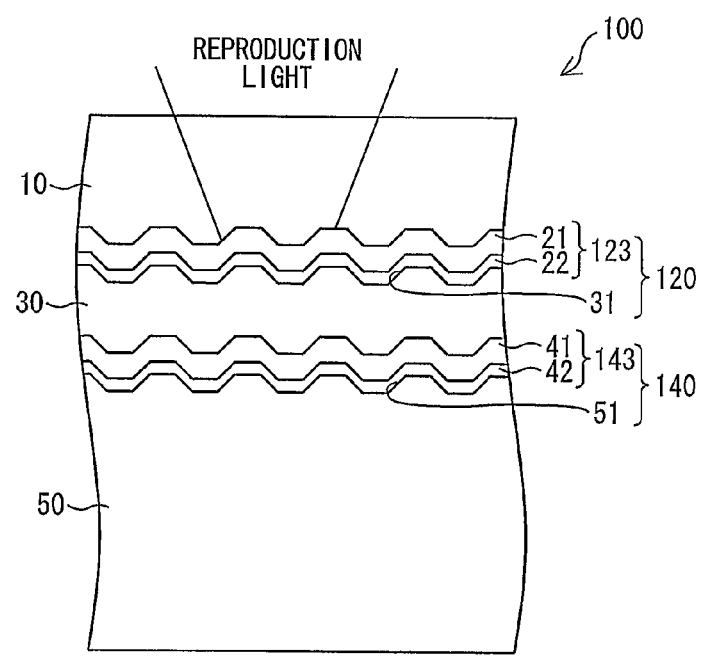
FIG. 8 is a schematic view showing a configuration of an optical information recording medium of the present invention.
Figure 9:
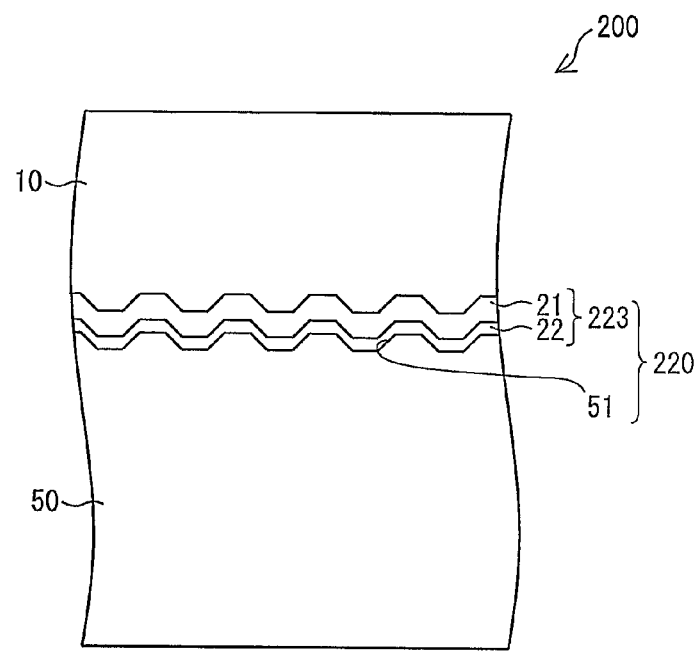
FIG. 9 is a schematic view showing a configuration of an optical information recording medium of a comparative example.
Figure 10:
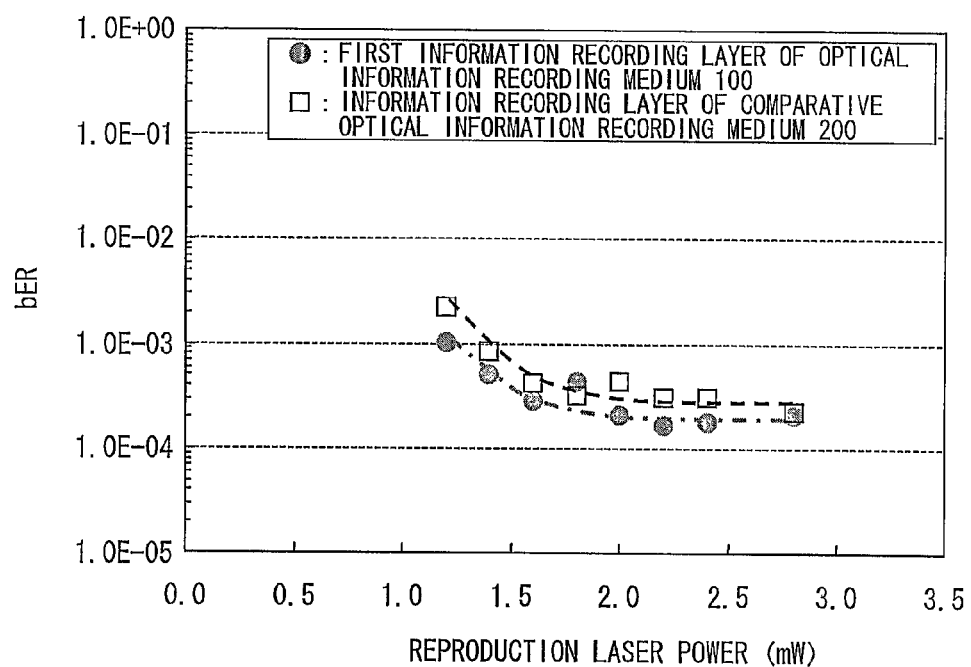
FIG. 10 shows results of evaluation of information recorded on a first information recording layer of the optical information recording medium of FIG. 8 and information recorded on an information recording layer of the optical information recording medium of FIG. 9.

First, the following shows, with reference to FIGS. 8 through 10, that the reproducing characteristic of each information recording layer of a multilayer super-resolution optical information recording medium can be envisaged on the basis of the result of an optical information recording medium having a single information recording layer produced in a similar manner to each information recording layer of the multilayer super-resolution optical information recording medium, as long as the thickness etc. of an intermediate layer that separates the information recording layers from each other are appropriate.

Two types of sample, namely an optical information recording media (multilayer super-resolution optical information recording medium) 100 and an optical information recording medium 200 each including a read-only information recording layer(s), were prepared, and an experiment for evaluating reproduction signals from the respective information recording layers as obtained by reproducing information recorded on the two types of sample was conducted in the following manner.

The optical information recording medium 100 and the optical information recording medium 200 are different from each other in that whereas the optical information recording medium 100 includes two information recording layers, the optical information recording medium 200 includes a single information recording layer. The optical information recording medium 100 and the optical information recording medium 200 are similar to each other except for this point.

FIG. 8 is a schematic view showing a configuration of the optical information recording medium 100 of the present embodiment.

As shown in FIG. 8, the optical information recording medium 100 thus prepared had a configuration in which a cover layer 10, a first information recording layer 120, an intermediate layer 30, a second information recording layer 140, and a substrate 50, were stacked in this order from an incident side on which reproduction light is incident.

It should be noted that a reproduction optical system of a reproducing device for reproducing information recorded on the optical information recording medium 100 has a reproduction wavelength λ of 405 nm and has an N.A. of 0.85.

The cover layer 10 was made of an ultraviolet curing resin having a thickness of 75 μm (with a refractive index of 1.50 at a reproduction light wavelength of 405 nm).

The first information recording layer 120 includes (i) a super-resolution film 123 constituted by two thin films and (ii) a group of pre-pits 31 formed in the intermediate layer 30 put underneath the first information recording layer 120.

As the two thin films constituting the super-resolution film 123, a reproduction film 21 and a reflection film 22 were stacked in this order from an incident side on which reproduction light is incident. The reproduction film 21 is made of zinc oxide having a thickness of 55 nm, and the reflection film 22 is made of Ti having a thickness of 6 nm. It should be noted that the first information recording layer 120 corresponds to the aforementioned first information recording layer 20.

The intermediate layer 30 was made of a transparent ultraviolet curing resin (with a refractive index of 1.50 at the reproduction light wavelength). The intermediate layer 30 had a thickness of 25 μm so that an interlayer crosstalk did not occur between the first information recording layer 120 and the second information recording layer 140. Provided on that surface of the intermediate layer 30 which faces the first information recording layer 120 is the group of pre-pits 31 formed in an in-pit recording format and placed at a track pitch of 0.32 μm (see FIG. 2). That is, the first information recording layer 120 has the group of pre-pits 31 that are provided so that the marks are depressed with respect to the light incident surface, and a push-pull for reproducing the information recorded on the first information recording layer 120 is negative in polarity.

The group of pre-pits 31 was formed in the intermediate layer 30 by carrying out 2P transfer twice with use of, a master, a substrate that (i) was compression-molded by the same stamper as the substrate 50 (described later) and (ii) was therefore substantially identical to the substrate 50. The phrase "carrying out 2P transfer twice" means that the first 2P transfer was carried out from the original master, and then the second 2P transfer was carried out with use of the resulting 2P transferred substrate as a master. Thus, the group of pre-pits 31 was formed as depressions in accordance with information recorded in the form of shapes on the first information recording layer 120.

The second information recording layer 140 includes (i) a super-resolution film 143 constituted by two thin films and (ii) a group of pre-pits 51 formed in the substrate 50 put underneath the second information recording layer 140.

As the two thin films constituting the super-resolution film 123, a reproduction film 41 and a reflection film 42 are stacked in this order from an incident side on which reproduction light is incident. The reproduction film 41 is made of zinc oxide having a thickness of 65 nm, and the reflection film 42 is made of Ta having a thickness of 7 nm. It should be noted that the second information recording layer 140 corresponds to the aforementioned second information recording layer 40.

The substrate 50 is a disk-shaped polycarbonate substrate having a diameter of 120 mm and a thickness of 1.1 mm. Provided on that surface of the substrate 50 which faces the second information recording layer 140 is the group of pre-pits 51 formed in an in-pit recording format and placed at a track pitch of 0.32 μm (see FIG. 3).

The group of pre-pits 51 are constituted by depressions and protrusions formed in accordance with information recorded in the form of shapes on the second information recording layer 140. Information is recorded on the second information recording layer 140 by providing the group of pre-pits 51 so that the marks are depressed with respect to the light incident surface. A push-pull for reproducing the information recorded by the group of pre-pits 51 is negative in polarity.

The information recorded by the groups of pre-pits 31 and 51 is reproduced by modulating it in accordance with the 1-7RLL modulation method. The groups of pre-pits 31 and 51 are formed so that the marks 32 and 52 have a plurality of lengths. The marks 32 and 52 are provided so that the average length of the smallest mark and the smallest space is 93 nm, which is less than or equal to the resolution limit (λ/(4 N.A.)= 119 nm) of the reproduction optical system.

FIG. 9 is a schematic view showing a configuration of the optical information recording medium 200, which serves as a comparative example.

The optical information recording medium 200 is a single-layer optical information recording medium for comparison as obtained by adapting the first information recording layer 120 stacked on the substrate 50 of FIG. 8 to a single-layer disk.

As shown in FIG. 9, the optical information recording medium 200 has a structure in which a cover layer 10, an information recording layer 220, and a substrate 50 are stacked in this order from an incident side on which reproduction light is incident.

The information recording layer 220 includes (i) a super-resolution film 223 constituted by two thin films and (ii) a group of pre-pits 51, as with the first information recording layer 120 of FIG. 8. That is, the information recording layer 220 has a structure in which a reproduction film 21, a reflecting film 22, and the group of pre-pits 51 stacked in this order from the incident side on which reproduction light is incident.

The substrate 50 has the group of pre-pits 51 formed on a surface thereof which faces the information recording layer 220, as in the optical information recording medium 100 of FIG. 8.

The dependence on reproduction power (reproducing characteristic) of a bit error rate (hereinafter referred to as bER) indicating an error rate of reproduction of (i) information recorded on the first information recording layer 120 of the optical information recording medium 100 and (ii) the information recorded on the information recording layer 220 of the optical information recording medium 200 was evaluated by using evaluation machines.

The evaluation machines used were (i) DDU-1000 (reproduction optical system; reproduction light wavelength (λ)= 405 nm; numerical aperture N.A.=0.85), which is a product of PULSETEC INDUSTRIAL CO., LTD. and is a general BD evaluation machine, (ii) a signal detector for BD evaluation manufactured by PULSETEC INDUSTRIAL CO., LTD., and (iii) general signal processing PRML (12221) as high-density signal processing.

It should be noted, however, that in order to be compatible with high density, the signal detector for BD evaluation manufactured by PULSETEC INDUSTRIAL CO., LTD. had been altered so that only the gain increased by 10 dB.

FIG. 10 shows results of evaluation of information recorded on the first information recording layer 120 of the optical information recording medium 100 and information recorded on the information recording layer 220 of the optical information recording medium 200.

In FIG. 10, the horizontal axis represents reproduction laser power (i.e., reproduction light intensity) (mW) of the evaluation machine, and the vertical axis represents bER.

As shown in FIG. 10, as a result of comparison between (i) the reproducing characteristics of the first information recording layer 120 of the optical information recording medium 100 having two information recording layers and (ii) the reproducing characteristics of the information recording layer 220 of the optical information recording medium 200 having a single information recording layer, almost no difference can be found between these reproducing characteristics.

That is, the first information recording layer 120 and the information recording layer 220 are almost identical in terms of the amount of change in bER relative to a change in reproduction laser power intensity.

Accordingly, the evaluation results of FIG. 10 show that in a case where the intermediate layer 30 is properly provided so that an interlayer crosstalk does not occur, there is no influence on the reproducing characteristic of each information recording layer of the super-resolution multilayer optical information recording medium, except for a loss in amount of light as caused by transmission of light through the information recording layer.

Further, although not illustrated, as a result of comparison between (i) the reproducing characteristics of the second information recording layer 140 of the optical information recording medium 100 and (ii) the reproducing characteristics of the information recording layer 220 of the optical information recording medium 200, almost no difference can be found between these reproducing characteristics, except for the decrease in reproduction sensitivity as caused by a light loss caused by transmission of light through the first information recording layer 120.

This experimental result shows that whether or not the reproducing characteristics of each information recording layer of a super-resolution multilayer optical information recording medium are superior or inferior can be determined simply by measuring the reproducing characteristics of a single-layer optical information recording medium having a single information recording layer.

(Relationship Between (i) the Recording Format of Pre-Pits and the Configuration of Information Recording Layers and (ii) Reproducing Characteristics)

For confirmation of whether reproduction on each information recording layer of a read-only multilayer optical information recording media is superior or inferior according to the recording format of pre-pits and the density of pre-pits, the following experimental optical disks, i.e., single-layer optical information recording media 300A, 300B, 400A, 400B, 500A, 500b, 600A, and 600B were prepared in accordance with the above conclusion.

(a) of FIG. 11 is a schematic view showing a configuration of the optical information recording medium 300A. (b) of FIG. 11 is a schematic view showing a configuration of the optical information recording medium 300B.

Figure 12:
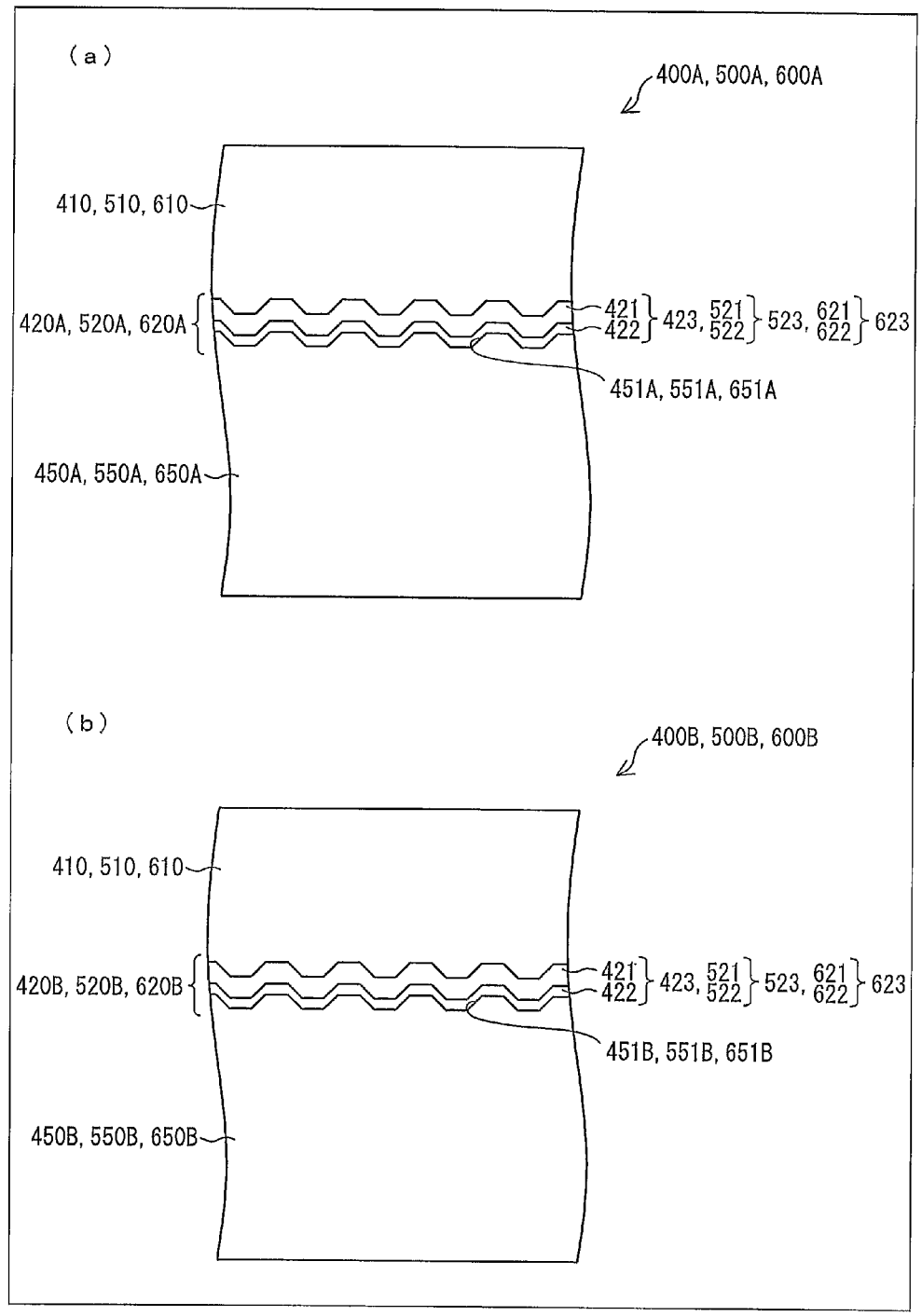
FIG. 12 is a set of schematic views (a) and (b), (a) showing configurations of optical information recording media 400A, 500A, and 600A, (b) showing configurations of optical information recording media 400B, 500B, and 600B.

(a) of FIG. 12 is a schematic view showing a configuration of each of the optical information recording media 400A, 500A, and 600A. (b) of FIG. 12 is a schematic view showing a configuration of each of the optical information recording media 400B, 500B, and 600B.

Figure 13:
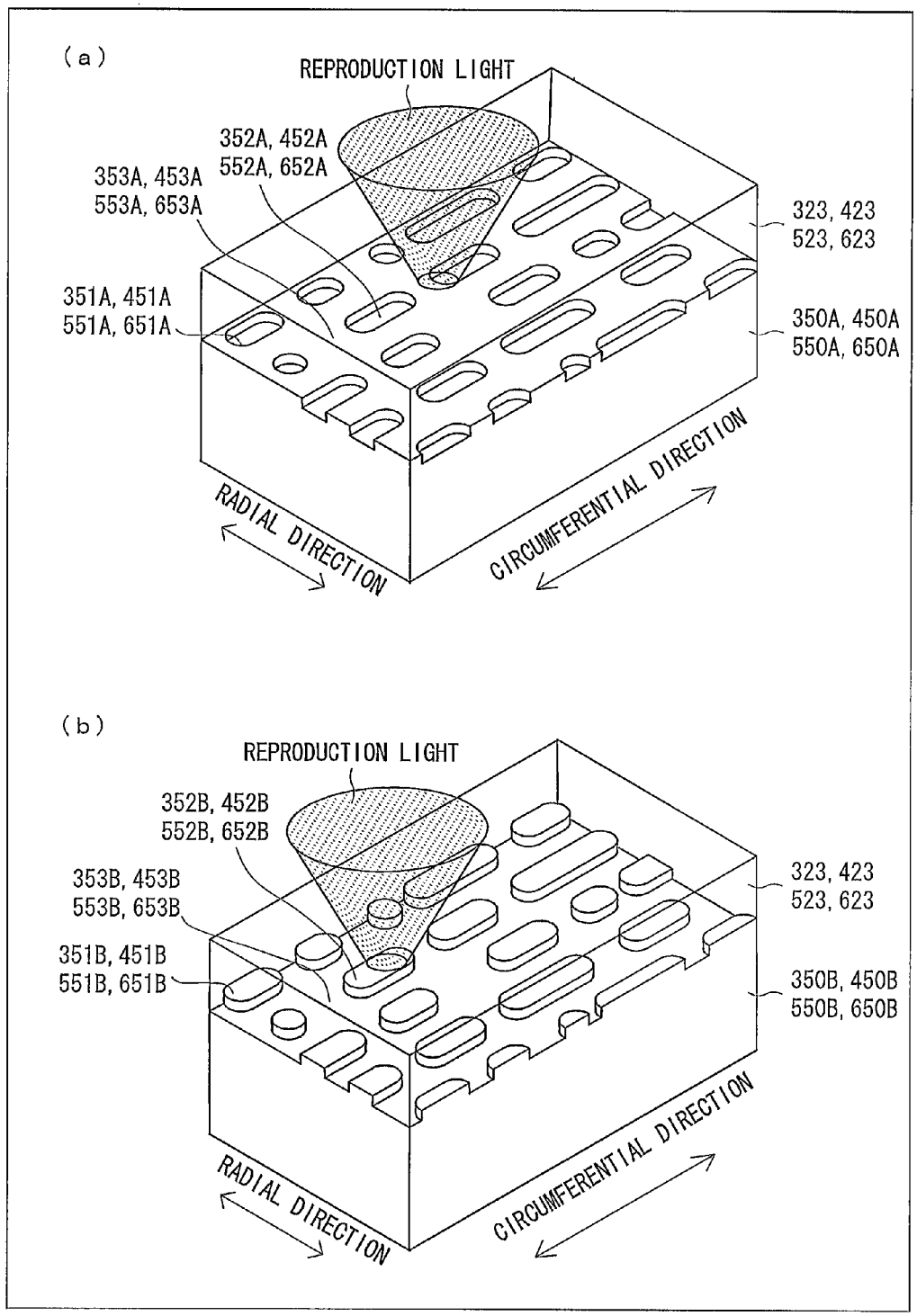
FIG. 13 is a set of enlarged perspective views (a) and (b), (a) showing a configuration of a group of pre-pits in an in-pit format, (b) showing a configuration of a group of pre-pits in an on-pit format.

(a) of FIG. 13 is an enlarged perspective view showing a configuration of a group of pre-pits in an in-pit format. (b) of FIG. 13 is an enlarged perspective view showing a configuration of a group of pre-pits in an on-pit format.

The optical information recording medium 300A has a structure in which a cover layer 310, an information recording layer 320A, and a substrate 350A are stacked in this order from an incident side on which reproduction light is incident (see (a) of FIG. 11).

The cover layer 310 was made of an ultraviolet curing resin having a thickness of 100 µm (with a refractive index of 1.50 at a reproduction light wavelength of 405 nm).

The information recording layer 320A includes (i) a non-super-resolution film 323 constituted by a single thin film and (ii) a group of pre-pits 351A formed in the substrate 350A put underneath the information recording layer 320A. The non-super-resolution film 323 was made of Ti having a thickness of 5 nm.

The substrate 350A was a disk-shaped polycarbonate substrate made of polycarbonate having a diameter of 120 mm and a thickness of 1.1 mm.

The substrate 350A had, on a surface thereof which faces the non-super-resolution film 323, the group of pre-pits 351A placed at a track pitch (i.e., a length along a radial direction) of 0.32 µm (see (a) of FIG. 13). It should be noted that the group of pre-pits 351A was constituted by depressions and protrusions formed in accordance with information recorded as shapes on the information recording layer 320A.

In the group of pre-pits 351A, a plurality of marks having different lengths along a circumferential direction were disposed so that information could be reproduced in accordance with the 1-7RLL modulation method.

The group of pre-pits 351A was provided so that the average length of the smallest mark and the smallest space among marks 352A and spaces 353A constituted by the group of pre-pits 351A was 149 nm (which corresponds to 25 GB on 120-mm-diameter disk basis). That is, the average length of the smallest mark and the smallest space constituted by the group of pre-pits 351A is greater than the resolution limit ($\lambda$/(4 N.A.)=119 nm) of a reproduction optical system.

Furthermore, the recording format of the group of pre-pits 351A formed in the substrate 350A was an in-pit format. That is, the group of pre-pits 351A was formed so that the marks 352A were more depressed than the spaces 353A with respect to the light incident surface. In other words, the group of pre-pits 351A was formed so that a push-pull signal in a case where the information recorded on the information recording layer 320A is reproduced was negative in polarity.

The optical information recording medium 300B has a structure in which a cover layer 310, an information recording layer 320B, and a substrate 350B are stacked in this order from an incident side on which reproduction light is incident (see (b) of FIG. 11).

The information recording layer 320B includes (i) a non-super-resolution film 323 and (ii) a group of pre-pits 351B formed in the substrate 350B put underneath the information recording layer 320B.

The optical information recording medium 300B is identical in configuration to the optical information recording medium 300A except for the substrate 350B (i.e., except for the recording format of the group of pre-pits 351B).

The substrate 350B was a disk-shaped polycarbonate substrate having a diameter of 120 mm and a thickness of 1.1 mm, as with the substrate 350A.

The substrate 350B had, on a surface thereof which faces the non-super-resolution film 323, the group of pre-pits 351B placed at a track pitch of 0.32 μm (see (b) of FIG. 13). It should be noted that the group of pre-pits 351B was constituted by depressions and protrusions formed in accordance with information recorded as shapes on the information recording layer 320A. The recording format of the group of pre-pits 351B was an on-pit format.

That is, the group of pre-pits 351B was formed so that marks 352B were more protruding than spaces 353B with respect to the light incident surface. In other words, the group of pre-pits 351B was formed so that a push-pull in a case where the information recorded on the information recording layer 320B is reproduced was positive in polarity.

The group of pre-pits 351B was formed by carrying out a 2P transfer with the use of, as a master, a substrate that (i) was compression-molded by the same stamper as the substrate 350A and (ii) was therefore substantially identical to the substrate 350A. Thus, the group of pre-pits 351B in the on-pit format was formed in the substrate 350B.

That is, the substrates 350A and 350B were in a so-called negative-positive relationship in photographic terms.

The optical information recording medium 400A has a structure in which a cover layer 410, an information recording layer 420A, and a substrate 450A are stacked in this order from an incident side on which reproduction light was incident (see (a) of FIG. 12).

The cover layer 410 was made of an ultraviolet curing resin having a thickness of 100 μm (with a refractive index of 1.50 at a reproduction light wavelength of 405 nm).

The information recording layer 420A includes (i) a super-resolution film 423 constituted by two thin films, namely a reproduction film 421 and a reflecting film 422, stacked in this order from the incident side on which reproduction light was incident and (ii) a group of pre-pits 451 formed in the substrate 450A put underneath the information recording layer 420A.

The reproduction film 421 was made of zinc oxide having a thickness of 60 nm. The reflecting film 422 was made of Ta having a thickness of 7 nm.

The substrate 450A was a disk-shaped polycarbonate substrate having a diameter of 120 mm and a thickness of 1.1 mm.

The substrate 450A had, on a surface thereof which faces the super-resolution film 423, the group of pre-pits 451A placed at a track pitch of 0.32 μm (see (a) of FIG. 13). It should be noted that the group of pre-pits 451A was constituted by depressions and protrusions formed in accordance with information recorded as shapes on the information recording layer 420A.

In the group of pre-pits 451A, a plurality of marks having different lengths along a circumferential direction were disposed so that information could be reproduced in accordance with the 1-7RLL modulation method.

The group of pre-pits 451A was provided so that the average length of the smallest mark and the smallest space among marks 452A and spaces 453A constituted by the group of pre-pits 451A was 149 nm (which corresponds to 25 GB on 120-mm-diameter disk basis). That is, the average length of the smallest mark and the smallest space constituted by the group of pre-pits 451A is greater than the resolution limit ($\lambda$/(4 N.A.)=119 nm) of a reproduction optical system.

Furthermore, the recording format of the group of pre-pits 451A formed in the substrate 450A was an in-pit format. That is, the group of pre-pits 451A was formed so that the marks 452A were depressed with respect to the light incident surface. In other words, the group of pre-pits 451A was formed so that a push-pull signal in a case where the information recorded on the information recording layer 420A is reproduced was negative in polarity.

It should be noted that the substrate 450A is a substrate formed through the same master through which the substrate 350A was formed, and as such, is substantially identical to the substrate 350A.

The optical information recording medium 400B has a structure in which a cover layer 410, an information recording layer 420B, and a substrate 450B are stacked in this order from an incident side on which reproduction light was incident (see (b) of FIG. 12). The optical information recording medium 400B is identical in configuration to the optical information recording medium 400A except for the substrate 450B (i.e., except for the recording format of a group of pre-pits 451B).

The information recording layer 420B includes (i) a super-resolution film 423 constituted by two thin films, namely a reproduction film 421 and a reflecting film 422, stacked in this order from the incident side on which reproduction light was incident and (ii) a group of pre-pits 451B formed in the substrate 450A put underneath the information recording layer 420B.

The substrate 450B was a disk-shaped polycarbonate substrate having a diameter of 120 mm and a thickness of 1.1 mm as with the substrate 450A.

The substrate 450B had, on a surface thereof which faces the super-resolution film 423, the group of pre-pits 451B placed at a track pitch of 0.32 μm (see (b) of FIG. 13). It should be noted that the group of pre-pits 451B was constituted by depressions and protrusions formed in accordance with information recorded as shapes on the information recording layer 420. The recording format of the group of pre-pits 451B was an on-pit format.

That is, the group of pre-pits 451B was formed so that marks 452B were more protruding than spaces 453B with respect to the light incident surface. In other words, the group of pre-pits 451B was formed so that a push-pull in a case where the information recorded on the information recording layer 420B is reproduced was positive in polarity.

The group of pre-pits 451B was formed by carrying out a 2P transfer with the use of, as a master, a substrate that (i) was compression-molded by the same stamper as the substrate 450A and (ii) was therefore substantially identical to the substrate 450A. Thus, the group of pre-pits 451B in the on-pit format was formed in the substrate 450B.

That is, the substrates 450A and 450B were in a so-called negative-positive relationship in photographic terms.

The optical information recording medium 500A has a structure in which a cover layer 510, an information recording layer 520A, and a substrate 550A are stacked in this order from an incident side on which reproduction light was incident (see (a) of FIG. 12).

The cover layer 510 was made of an ultraviolet curing resin having a thickness of 100 μm (with a refractive index of 1.50 at a reproduction light wavelength of 405 nm).

The information recording layer 520A includes (i) a super-resolution film 523 constituted by two thin films, namely a reproduction film 521 and a reflecting film 522, stacked in this order from the incident side on which reproduction light was incident and (ii) a group of pre-pits 551A formed in the substrate 550A put underneath the information recording layer 520A. The reproduction film 521 was made of zinc oxide having a thickness of 60 nm. The reflecting film 522 was made of Ta having a thickness of 7 nm.

The substrate 550A was a disk-shaped polycarbonate substrate having a diameter of 120 mm and a thickness of 1.1 mm.

The substrate 550A had, on a surface thereof which faces the super-resolution film 523, the group of pre-pits 551A placed at a track pitch of 0.32 μm (see (a) of FIG. 13). It should be noted that the group of pre-pits 551A was constituted by depressions and protrusions formed in accordance with information recorded as shapes on the information recording layer 520A.

In the group of pre-pits 551A, a plurality of marks 552A having different lengths along a circumferential direction were disposed so that information could be reproduced in accordance with the 1-7RLL modulation method.

The group of pre-pits 551A was provided so that the average length of the smallest mark and the smallest space among the marks 552A and spaces 553A constituted by the group of pre-pits 551A was 113 nm (which corresponds to 33 GB on 120-mm-diameter disk basis). That is, the average length of the smallest mark and the smallest space constituted by the group of pre-pits 551A is less than or equal to the resolution limit ($\lambda/(4\text{ N.A.})$=119 nm) of a reproduction optical system.

Furthermore, the recording format of the group of pre-pits 551A formed in the substrate 550A was an in-pit format. That is, the group of pre-pits 551A was formed so that the marks 552A were depressed with respect to the light incident surface. In other words, the group of pre-pits 551A was formed so that a push-pull signal in a case where the information recorded on the information recording layer 520A is reproduced was negative in polarity.

The optical information recording medium 500B has a structure in which a cover layer 510, an information recording layer 520B, and a substrate 550B are stacked in this order from an incident side on which reproduction light was incident (see (b) of FIG. 12). The optical information recording medium 500B is identical in configuration to the optical information recording medium 500A except for the substrate 550B (i.e., except for the recording format of a group of pre-pits 551B).

The information recording layer 520B includes (i) a super-resolution film 523 constituted by two thin films, namely a reproduction film 521 and a reflecting film 522, stacked in this order from the incident side on which reproduction light was incident and (ii) a group of pre-pits 551B formed in the substrate 550B put underneath the information recording layer 520B.

The substrate 550B was a disk-shaped polycarbonate substrate having a diameter of 120 mm and a thickness of 1.1 mm, as with the substrate 550A.

The substrate 550B had, on a surface thereof which faces the super-resolution film 523, the group of pre-pits 551B placed at a track pitch of 0.32 μm (see (b) of FIG. 13). It should be noted that the group of pre-pits 551B was constituted by depressions and protrusions formed in accordance with information recorded as shapes on the information recording layer 540B. The recording format of the group of pre-pits 551B was an on-pit format.

That is, the group of pre-pits 551B was formed so that marks 552B were more protruding than spaces 553B with respect to the light incident surface. In other words, the group of pre-pits 551B was formed so that a push-pull in a case where the information recorded on the information recording layer 520B is reproduced was positive in polarity.

The group of pre-pits 551B was formed by carrying out a 2P transfer with the use of, as a master, a substrate that (i) was compression-molded by the same stamper as the substrate 550A and (ii) was therefore substantially identical to the substrate 550A. Thus, the group of pre-pits 551B in the on-pit format was formed in the substrate 550B.

That is, the substrates 550A and 550B were in a so-called negative-positive relationship in photographic terms.

The optical information recording medium 600A has a structure in which a cover layer 610, an information recording layer 620A, and a substrate 650A are stacked in this order from an incident side on which reproduction light was incident (see (a) of FIG. 12).

The cover layer 610 was made of an ultraviolet curing resin having a thickness of 100 μm (with a refractive index of 1.50 at a reproduction light wavelength of 405 nm).

The information recording layer 620A includes (i) a super-resolution film 623 constituted by two thin films, namely a reproduction film 621 and a reflecting film 622, stacked in this order from the incident side on which reproduction light was incident and (ii) a group of pre-pits 651A formed in the substrate 650A put underneath the information recording layer 620A. The reproduction film 621 was made of zinc oxide having a thickness of 60 nm. The reflecting film 622 was made of Ta having a thickness of 7 nm.

The substrate 650A was a disk-shaped polycarbonate substrate having a diameter of 120 mm and a thickness of 1.1 mm.

The substrate 650A had, on a surface thereof which faces the super-resolution film 623, the group of pre-pits 651A placed at a track pitch of 0.32 μm (see (a) of FIG. 13). It should be noted that the group of pre-pits 651A was constituted by depressions and protrusions formed in accordance with information recorded as shapes on the information recording layer 640.

In the group of pre-pits 651A, a plurality of marks having different lengths along a circumferential direction were disposed so that information could be reproduced in accordance with the 1-7RLL modulation method.

The group of pre-pits 651A was provided so that the average length of the smallest mark and the smallest space among marks 652A and spaces 653A constituted by the group of pre-pits 651A was 83 nm (which corresponds to 45 GB on 120-mm-diameter disk basis). That is, the average length of the smallest mark and the smallest space constituted by the group of pre-pits 651A is less than or equal to the resolution limit ($\lambda/(4$ N.A.$)=119$ nm) of a reproduction optical system.

Furthermore, the recording format of the group of pre-pits 651A formed in the substrate 650A was an in-pit format. That is, the group of pre-pits 651A was formed so that the marks 652A were depressed with respect to the light incident surface. In other words, the group of pre-pits 651A was formed so that a push-pull signal in a case where the information recorded on the information recording layer 620A is reproduced is negative in polarity.

The optical information recording medium 600B has a structure in which a cover layer 610, an information recording layer 620B, and a substrate 650B are stacked in this order from an incident side on which reproduction light was incident (see (b) of FIG. 12). The optical information recording medium 600B is identical in configuration to the optical information recording medium 600A except for the substrate 650B (i.e., except for the recording format of a group of pre-pits 651B).

The information recording layer 620B includes (i) a super-resolution film 623 constituted by two thin films, namely a reproduction film 621 and a reflecting film 622, stacked in this order from the incident side on which reproduction light was incident and (ii) a group of pre-pits 651B formed in the substrate 650B put underneath the information recording layer 620B.

The substrate 650B was a disk-shaped polycarbonate substrate having a diameter of 120 mm and a thickness of 1.1 mm, as with the substrate 650A.

The substrate 650B had, on a surface thereof which faces the super-resolution film 623, the group of pre-pits 651B placed at a track pitch of 0.32 μm (see (b) of FIG. 13). It should be noted that the group of pre-pits 651B was constituted by depressions and protrusions formed in accordance with information recorded as shapes on the information recording layer 620B. The recording format of the group of pre-pits 651 was an on-pit format.

That is, the group of pre-pits 651B was formed so that marks 652B were formed more protruding than spaces 653B with respect to the light incident surface. In other words, the group of pre-pits 651B was formed so that a push-pull in a case where the information recorded on the information recording layer 620B is reproduced is positive in polarity.

The group of pre-pits 651B was formed by carrying out a 2P transfer with the use of, as a master, a substrate that (i) was compression-molded by the same stamper as the substrate 650A and (ii) was therefore substantially identical to the substrate 650A. Thus, the group of pre-pits 651B in the on-pit format was formed in the substrate 650B.

That is, the substrates 650A and 650B were in a so-called negative-positive relationship in photographic terms.

FIG. 14 shows results of measurement of reproduction signals of experimental optical information recording media.

Whether the reproducing characteristics of the experimental single-layer optical information recording media 300A to 600B are superior or inferior was determined with reference FIG. 14 by measuring a bottom level of jitter (commonly-used criterion for evaluation of signal reproducing characteristics in a low density) or of bER (bit error rate) in each of the optical information recording media 300A to 600B with use of the aforementioned evaluation machines and the like.

FIG. 14 shows (i) results (jitter or bER) of measurement performed on the experimental optical information recording media and (ii) signal waveforms obtained in the measurement. In each oscilloscopic image showing a signal waveform in FIG. 14, the horizontal axis indicates time and the vertical axis indicates voltage.

First, a comparison is made among the optical information recording media 500A, 500B, 600A, and 600B each provided with a group of pre-pits having a mark length that is less than or equal to the resolution limit ($\lambda/(4$ N.A.$)=119$ nm) (which corresponds to 33 GB on 120-mm-diameter disk basis) of a reproduction optical system.

As described above, the only difference between the optical information recording medium 500A and the optical information recording medium 500B is that the depressions and protrusions of the group of pre-pits 551A are in converse relation with the depressions and protrusions of the group of pre-pits 551B. Similarly, the only difference between the optical information recording medium 600A and the optical information recording medium 600B is that the depressions and protrusions of the group of pre-pits 651A are in converse relation with the depressions and protrusions of the group of pre-pits 651B.

However, as is clear from FIG. 14, a comparison of reproducing characteristics between the optical information recording medium 500A and the optical information recording medium 500B shows that the jitter of the optical information recording medium 500B took on a bottom level of 27.5%, whereas the jitter of the optical information recording medium 500A took on a bottom level of 10.9%, i.e., that the jitter of the optical information recording medium 500A is took on a lower bottom level than the jitter of the optical information recording medium 500B.

It was thus found that the optical information recording medium 500A had superior reproducing characteristics to the optical information recording medium 500B.

Similarly, a comparison of reproducing characteristics between the optical information recording medium 600A and the optical information recording medium 600B shows that the bER of the optical information recording medium 600A took on a bottom level of $3.6\times10^{-5}$, which is sufficiently lower than $3.0\times10^{-4}$, which is generally required for practical use, whereas the optical information recording medium 600B ends up being incapable of even generating clocks minimum required for decoding a reproduction signal.

It was thus found that the optical information recording medium 600A had superior reproducing characteristics to the optical information recording medium 600B.

Accordingly, it was found that even in the case of use of substrates having groups of pre-pits identical to each other in terms of the density of marks, reproducing characteristics varied significantly depending on whether the recording format of the groups of pre-pits was an on-pit format or an in-pit format. It was found that an in-pit format gives better reproducing characteristics than an on-pit format.

Further, FIG. 14 shows that the larger the density (information recording density) of marks is, the greater the difference between reproducing characteristics obtained in an in-pit format and reproducing characteristics obtained in an on-pit format is.

In particular, it was found that when the average length of the smallest mark (mark 652B) and the smallest space (space 653B) is 83 nm ($=\lambda/(5.76$ NA (which corresponds to 45 GB on a 120-mm-diameter disk basis))) as in the case of the group of pre-pits 651B of the optical information recording medium 600B, it becomes impossible to even generate a clock.

That is, when the average length of the smallest mark and the smallest space among the group of pre-pits 651 is 83 nm ($\lambda/(5.76$ NA)), it is impossible to generate a clock and, accordingly, it is impossible to improve bER (i.e., reproducing characteristic) by upgrading signal processing (e.g., changing from PRML (1221) to PRML (12221), etc.).

Next, as can be seen from FIG. 14, a comparison of reproducing characteristics between (i) the optical information recording media 300A and 400A and (ii) the optical information recording media 300B and 400B showed that the jitter of the optical information recording medium 300A took on an approximately equal bottom level to the jitter of the optical information recording medium 300B and that the jitter of the optical information recording medium 400A took on an approximately equal bottom level to the jitter of the optical information recording medium 400B. It was thus found that there was no big difference in reproducing characteristic between the optical information recording media 300A and 400A and the optical information recording media 300B and 400B.

That is, among the optical information recording media 300A, 300B, 400A, and 400B (e.g., which corresponds to 25 GB on a 120-mm-diameter disk basis) having the respective groups of pre-pits (the group of pre-pits 351A, the group of pre-pits 351B, the group of pre-pits 451A, and the group of pre-pits 451B, respectively), among each of which the average length between the smallest mark and the smallest space was greater than the resolution limit ($\lambda/(4\ N.A.)=119$ nm) of a reproduction optical system, there was no big difference in reproducing characteristic between an on-pit format and an in-pit format, regardless of whether the information recording layers were super-resolution films (the information recording layers 420A, 420B, 520A, 520B, 620A, and 620B) or non-super-resolution films (the information recording layers 320A and 320B).

This showed that the reason for better reproducing characteristics that are obtained in a case where the recording format of a group of pre-pits is an in-pit format is that reproducing characteristics depend on the recording density (i.e., the average length of the smallest mark and the smallest space among the group of pre-pits), regardless of the type of information recording layer (whether the information recording layer is a super-resolution film or a non-super-resolution film).

This showed that in order to reproduce information recorded on an optical information recording medium provided with a group of pre-pits having a mark length less than or equal to the resolution limit ($\lambda/(4\ N.A.)=119$ nm) of a reproduction optical system (which corresponds to 33 GB on a 120-mm-diameter disk basis), use of an in-pit format as the recording format of the group of pre-pits, regardless of whether the information recording layer is a super-resolution film or a non-super-resolution film, allowed achieving better reproducing characteristics as compared with a case in which the recording format of the group of pre-pits is an on-pit format.

(2-2. Comparison with a Multilayer Super-Resolution Optical Information Recording Medium Based on a Monotone Recording Method)

Next, results of comparison of reproducing characteristic between the optical information recording medium according to the present embodiment and a multilayer super-resolution optical information recording medium based on the monotone recording method are explained with reference to FIGS. 15 through 17.

Figure 15:
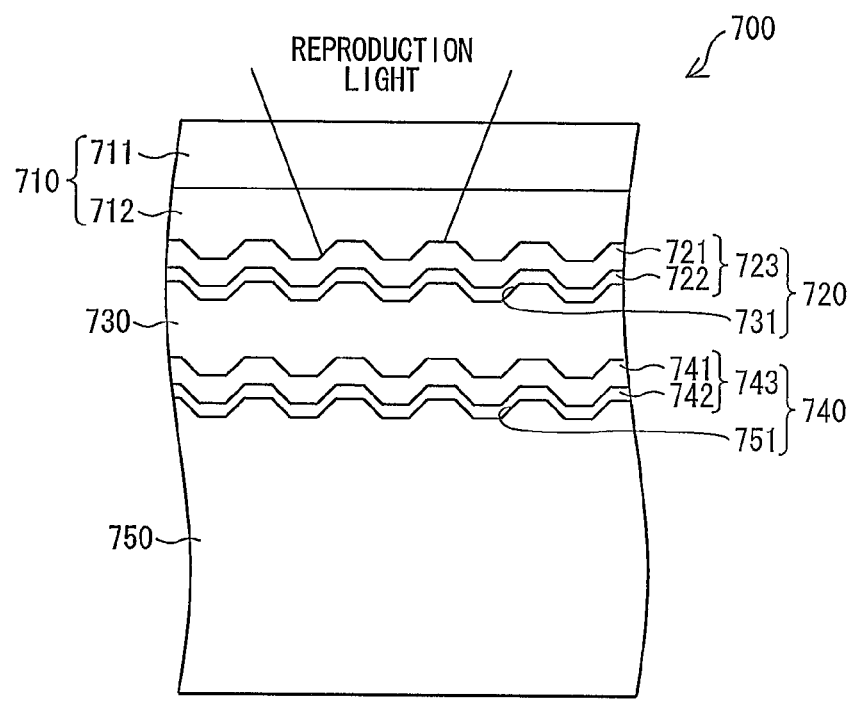
FIG. 15 is a schematic view showing a configuration of an optical information recording medium having pre-pits formed in a monotone format.

FIG. 15 is a schematic view showing a configuration of an optical information recording medium 700 having pre-pits formed in a monotone format.

Figure 16:
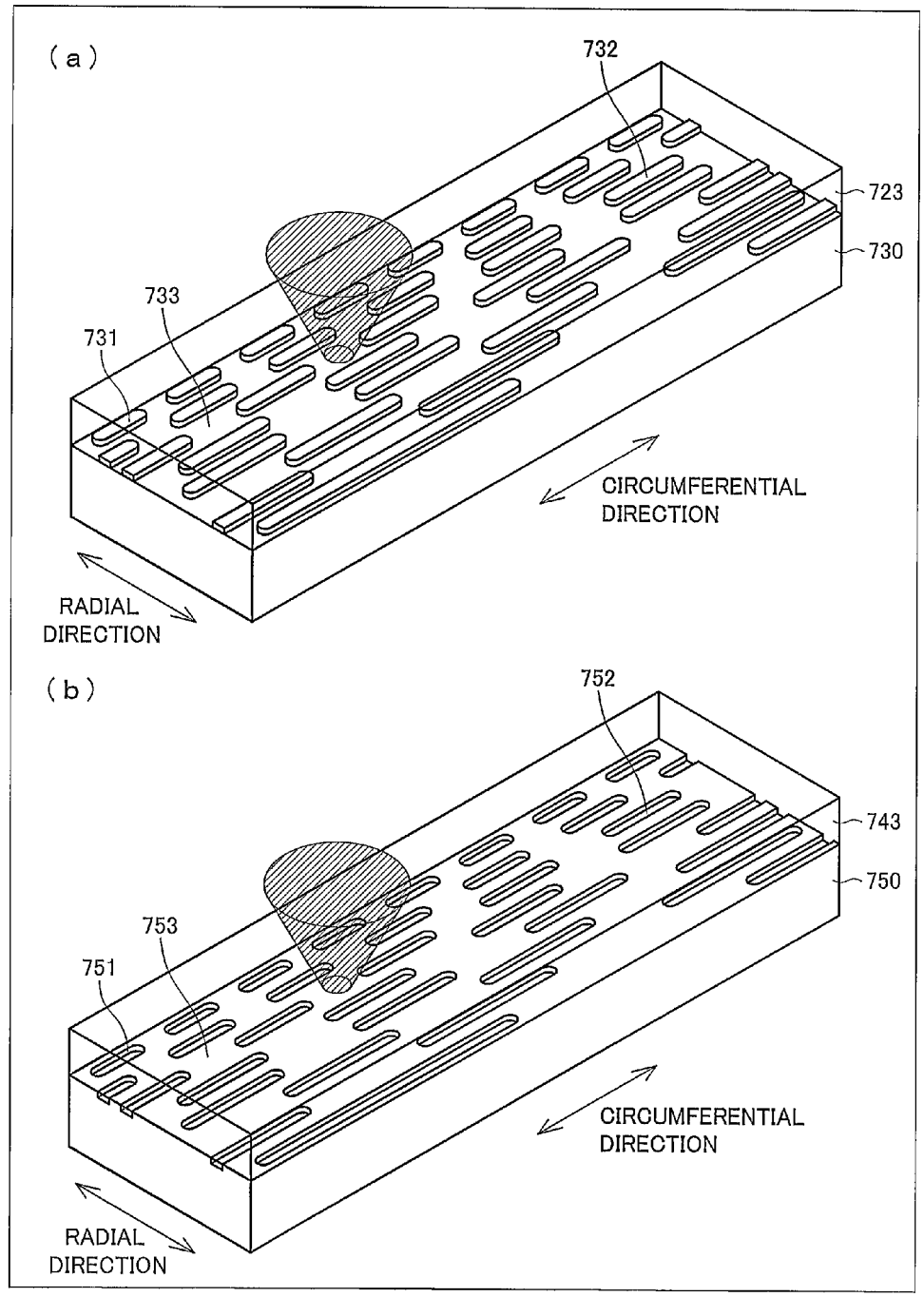
FIG. 16 is a set of enlarged perspective views (a) and (b), (a) showing a configuration of a group of pre-pits in a monotone on-pit format, (b) showing a configuration of a group of pre-pits in a monotone in-pit format.

(a) of FIG. 16 is an enlarged perspective view showing a configuration of a group of pre-pits in a monotone on-pit format, and (b) of FIG. 16 is an enlarged perspective view showing a configuration of a group of pre-pits in a monotone in-pit format.

As shown in FIG. 15, the optical information recording medium 700 has a structure in which a cover layer 710, a first information recording layer 720, an intermediate layer 730, a second information recording layer 740, and a substrate 750 are stacked in this order from an incident surface side on which reproduction light is incident.

The cover layer 710 is constituted by two layers: a polycarbonate film 711 having a film thickness of 80 µm and a transparent adhesive resin layer having a film thickness of 20 µm. The polycarbonate film 711 and the transparent adhesive resin layer are stacked in this order from the incident side on which reproduction light is incident.

The first information recording layer 720 is constituted by (i) a super-resolution film 723 constituted by two thin films, namely a reproduction film 721 and a reflecting film 722, which are stacked in this order from the incident side on which reproduction light is incident and (ii) a group of pre-pits 731 formed in an intermediate layer 730 put underneath the first information recording layer 720.

The reproduction film 721 was made of zinc oxide having a thickness of 175 nm, and the semi-transparent film 722 was made of Si having a thickness of 7 nm.

The intermediate layer 730 was made of a transparent ultraviolet curing resin having a thickness of 25 µm (with a refractive index of 1.50 at the reproduction light wavelength).

As shown in (a) of FIG. 16, the intermediate layer 730 had, on a surface thereof which faces the super-resolution film 723, the group of pre-pits 731, placed at a track pitch of 0.32 µm, whose recoding format was an on-pit recording format in accordance with information recorded as shapes on the first information recording layer 720.

The group of pre-pits 731 were formed by carrying of 2P transfer with the use of, as a master, a substrate that (i) was compression-molded by the same stamper as a substrate 750 (described later) and (ii) was therefore substantially identical to the substrate 750. Thus, the group of pre-pits 731 in the monotone on-pit format was formed in the intermediate layer 730. The group of pre-pits 731 are divided into eight regions.

In the example shown in (a) of FIG. 16, the group of pre-pits 731 is divided into eight regions along a radial direction. The average length of the length (mark length) of a mark 732 and the length (space length) of a space 733 in each of the regions is 60 nm, 80 nm, 100 nm, 120 nm, 140 nm, 160 nm, 200 nm, and 400 nm in the order of the eight regions along the radial direction.

As such, the group of pre-pits 731 is a group of pre-pits in a monotone format with eight different lengths (equivalent to densities), thus making it possible to determine reproducing characteristics in each of the regions.

As shown in FIG. 15, the second information recording layer 740 is constituted by (i) a super-resolution film 743 constituted by two thin films and (ii) a group of pre-pits 751 formed in the substrate 750 put underneath the second information recording layer 740. The super-resolution film 743 is constituted by (i) a reproduction film 741, which is made of zinc oxide having a thickness of 155 nm and (ii) a reflecting film 742, which is made of Si having a thickness of 50 nm. The reproduction film 741 and the reflecting film 742 are stacked in this order from the incident side on which reproduction light is incident.

The substrate 750 used was a disk-shaped polyolefin substrate having the group of pre-pits 751.

As shown in (b) of FIG. 16, the substrate 750 has, on a surface thereof faces the super-resolution film 743, the group of pre-pits 751, placed at a track pitch of 0.32 μm, whose recording format was an in-pit recording format in accordance with information recorded as shapes on the second information recording layer 740. The group of pre-pits 751 are divided into eight regions.

In the example shown in (b) of FIG. 16, the group of pre-pits 751 is divided into eight regions along the radial direction. The average length of the length (mark length) of a mark 752 and the length (space length) of a space 753 in each of the regions is 60 nm, 80 nm, 100 nm, 120 nm, 140 nm, 160 nm, 200 nm, and 400 nm in the order of the eight regions along radial direction.

As such, the group of pre-pits 751 is a group of pre-pits in a monotone format with eight different lengths (equivalent to densities), thus making it possible to determine reproducing characteristics in each of the regions.

Information recorded on the first information recording layer 720 of the optical information recording medium 700 and information recorded on the second information recording layer 740 of the optical information recording medium 700 were reproduced by an evaluation device having a reproduction optical system having a reproduction light wavelength of 404 nm and a numerical aperture of 0.85, and OTFs were measured.

Figure 17:
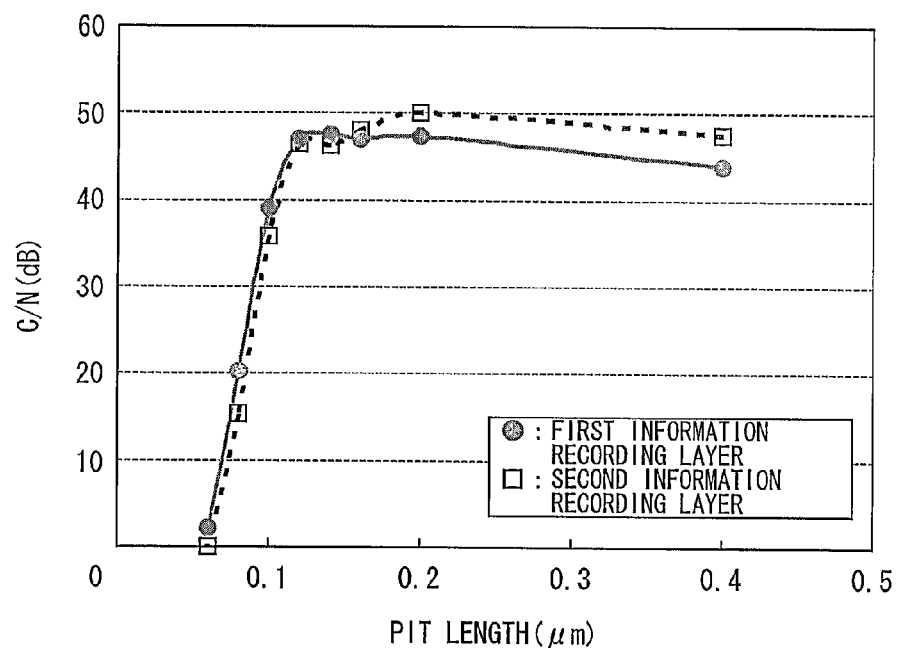
FIG. 17 shows the reproducing characteristics (OTF) of first and second information recording layers of the optical information recording medium of FIG. 15.

FIG. 17 shows the reproducing characteristics (OTF) of the first and second information recording layers 720 and 740 of the optical information recording medium 700 having the group of monotone pre-pits.

Note that OTF is an index that indicates super-resolution performance. OTF indicates the dependence of C/N (evaluation criterion indicating signal quality) the recording mark length (equivalent to the pit length in the case of a read-only optical information recording medium).

As is clear from FIG. 17, there is no significant difference in reproducing characteristic between the first information recording layer 720 and the second information recording layer 740.

That is, results shown in FIG. 17 show that in a multilayer super-resolution optical information recording medium based on the monotone recording method, such as the optical information recording medium 700, reproducing characteristics do not vary depending on the recording format (i.e., in-pit or on-pit) of pre-pits.

As is clear from the foregoing description, a common multilayer optical information recording medium employs a mark edge recording method for improvement in storage capacity. Furthermore, for reduction of cost, (i) a group of pre-pits provided for recording information on a first information recording layer located closer to a reproduction light incident surface than a second information layer is and (ii) a group of pre-pits provided for recording information on the second information recording layer, which is located further from the reproduction light incident surface than the first information recording layer, are in different recording formats: an in-pit format and an on-pit format.

For this reason, application of the super-resolution technology to the multilayer optical information recording medium causes one of the information recording layers in which information is recorded in an on-pit format to have significantly inferior reproducing characteristics to the other of the information recording layers in which information is recorded in an in-pit format.

On the other hand, as described above, in the optical information recording medium 1 according to the present embodiment, the recording format of the group of pre-pits 51, among which the average length of the smallest mark and the smallest space is less than the resolution limit ($\lambda/(4 N.A.) = 119$ nm) of a reproduction optical system, is an in-pit format. In addition, the second information recording layer 40, which is a super-resolution film that makes it possible to reproduce information recorded by the group of pre-pits 51, is provided on the substrate 50 provided with the group of pre-pits 51.

For this reason, there is no difference in characteristic between a signal reproduced on the second information recording layer 40 and a signal reproduced on the first information recording layer 20. This enables excellent, high-density signal reproduction with high reliability. Further, it becomes possible to provide an inexpensive and high-capacity multilayer optical information recording medium based on a super-resolution technology.

In a case where the average length of the smallest mark 52 and the smallest space 53 among the group of pre-pits 51 is less than or equal to $\lambda/(5.76$ NA$)$, the optical information recording medium 1 of the present embodiment is especially preferable.

This is because, as described above, a difference in reproducing characteristic between the in-pit format and the on-pit format becomes more significant as the average length of the smallest mark and the smallest space among the group of pre-pits 31 (51) becomes shorter than the resolution limit length of the reproduction optical system. In particular, in a case where the average length of the smallest mark and the smallest space is less than or equal to $\lambda/(5.76$ NA$)$, the generation of clocks, which is essential for carrying out signal processing for complementing the reproducing characteristics, becomes impossible.

Note that if clocks can be generated, signal processing methods (e.g., combined use of PRML (1221) and PRML (12221), which has a higher complementarity than that of PRML (1221), etc.) having different degrees of complementarity can be used depending on a signal reproduced. However, in a case where such a method is used, there is still such a problem that the optical information recording medium reproducing device becomes so complex in structure that there is an increase in cost.

On the other hand, the configuration of the optical information recording medium 1 makes it possible to prevent such a problem that clocks cannot be generated. For this reason, a reproduced signal can be complemented by a single signal processing method. This makes it possible to prevent the optical information recording medium reproducing device from being complex in structure, thus bringing about an effect of suppressing an increase in cost.

It should be noted that the optical information recording medium 1 is not limited to the above-described configuration in which both the group of pre-pits 31 and the group of pre-pits 51 are in an in-pit format. The optical information recording medium 1 can employ a configuration in which either the group of pre-pits 31 or the group of pre-pits 51 is in an in-pit format.

Furthermore, either of the first and second information recording layers 20 and 40 may be a layer (RE layer) on which information can be rewritten, instead of being a read-only ROM layer.

Furthermore, an optical information recording medium according to an embodiment of the present invention is not limited to any one the optical information recording media described above, and can be an information recording medium constituted by three or more layers by further including various types of information recording layer. In this case, the cover layer and the intermediate layer may be different in thickness from the those described above.

The present invention is not limited to the description of the embodiments above, but may be altered by a skilled person within the scope of the claims. An embodiment based on a proper combination of technical means disclosed in different embodiments is encompassed in the technical scope of the present invention.

As described above, an optical information recording medium of the present invention includes: a light transmittable layer having an incident surface on which reproduction light is incident; two or more information recording layers; a substrate, the light transmittable layer, the information recording layers, and the substrate being stacked in this order from an incident side on which the reproduction light is incident; and an intermediate layer that separates the information recording layers from each other, the two or more information recording layers having information recorded thereon as marks and spaces by a predetermined modulation method, the two or more information recording layers each including (i) a group of pre-pits constituting the marks and the spaces and (ii) a super-resolution film, the marks and the spaces constituted by the group of pre-pits having different lengths, an average length of a smallest mark that is smallest in length among the marks constituted by the group of pre-pits and a smallest space that is smallest in length among the space constituted by the group of pre-pits is less than or equal to a resolution limit of a reproduction optical system for reproducing the information recorded on the information recording layers, the resolution film being a film that enables the reproduction optical system to reproduce information recorded by the group of pre-pits, the group of pre-pits being formed so that a push-pull signal for the reproduction optical system to reproduce the information recorded by the group of pre-pits is negative in polarity.

The group of pre-pits here is constituted by a plurality of pre-pits. The pre-pits mean depressed and protruding shapes provided in and on the substrate and the intermediate layer.

Further, it is known that the resolution limit of the optical system for reading (reproducing) the information recoded as the marks and the spaces is approximately $\lambda/(4\,NA)$, where $\lambda$ is the reproduction light wavelength of the reproduction optical system and NA is the numerical aperture of the reproduction optical system. For this reason, the present application assumes that the resolution limit of the reproduction optical system for reproducing the information recorded on the information recording layers is $\lambda/(4\,NA)$.

Further, the average length of the smallest mark and the smallest space is a length that can be calculated from the predetermined modulation method and the density of the information recorded on the information recording layers. Structurally, for example, in the case of the 1-7RLL modulation method, the average length is an average length of the smallest mark, 2T mark length, and the smallest space, 2T space length.

According to the foregoing configuration, the two or more information recording layers separated from each other by the intermediate layer have information recorded thereon as marks and spaces by a predetermined modulation method. This allows the information thus recorded to be reproduced by a reproducing device capable of modulation by a predetermined modulation method.

According to the foregoing configuration, the two or more information recording layers each include a group of pre-pits constituting the marks and the spaces. That is, the information recording layer formed on the intermediate layer or on the substrate to include a group of pre-pits has information recorded thereon in the form of depressions and protrusions of the group of pre-pits. Such an information recording layer including a group of pre-pits is a read-only information recording layer.

According to the foregoing configuration, the marks constituted by the group of pre-pits have different lengths. By thus causing the marks to have different lengths, an improvement in density at which information is recorded can be achieved as compared with a so-called monotone pattern recording method (i.e., a mark position recording method) where marks have the same length.

According to the foregoing configuration, an average length of a smallest mark that is smallest in length among the marks constituted by the group of pre-pits and a smallest space that is smallest in length among the space constituted by the group of pre-pits is less than or equal to a resolution limit of a reproduction optical system for reproducing the information recorded on each of the information recording layers. This makes it possible to improve the density at which the marks and the spaces are disposed, thus making it possible to record a large volume of information on each of the information recording layers.

This makes it possible to suppress an increase in the number of information recording layers to be formed for an increase in volume of information to be recorded, thus making it possible to suppress an increase in manufacturing cost due to an increase in the number of information recording layers to be stacked.

According to the foregoing configuration, the resolution film is a film that enables the reproduction optical system to reproduce information recorded by the group of pre-pits. This allows the information recorded on the information recording layers to be reproduced by the reproduction optical system serving as a reproducing device.

It should be noted here that of optical information recording media, such an optical information recording media having two or more information recording layers stacked, with each information recording layer including (i) a group of pre-pits in which the average length of the smallest mark and the smallest space is less than or equal to the resolution limit of a reproduction optical system and (ii) a super-resolution film that is a film that enables the reproduction optical system to reproduce information recorded by the group of pre-pits is sometimes referred to as "multilayer super-resolution optical information recording medium".

A multilayer super-resolution optical information recording medium thus configured allows the reproduction optical system to reproduce a large volume of information recorded on each information recording layer of the multilayer super-resolution optical information recording medium.

By thus configuring a multilayer super-resolution optical information recording medium, an increase in the number of information recording layers to be formed for an increase in volume of information to be recorded. This makes it possible to suppress an increase in manufacturing cost due to an increase in the number of information recording layers to be stacked.

According to the foregoing configuration, the group of pre-pits is disposed so that a push-pull signal for the reproduction optical system to reproduce the information recorded by the group of pre-pits is negative in polarity. Such a group of pre-pits that a push-pull signal for the reproduction optical system to reproduce the information recorded by the group of pre-pits is negative in polarity has each pre-pit formed in an in-pit format.

It should be noted that the in-pit format is a format by which the marks are formed more depressed than the spaces with respect to the incident surface on which the reproduction light is incident.

This makes it possible to, even if the marks and the spaces are disposed so that the average length of the smallest mark and the smallest space is less than or equal to the resolution limit of the reproduction optical system, prevent deterioration of the reproducing characteristics of information that is obtained by the reproduction optical system reproducing the information recorded on the information recording layers.

Thus, the foregoing configuration makes it possible to provide an inexpensive and high-capacity optical information recording medium that is prevented from deteriorating in reproducing characteristic.

The optical information recording medium of the present invention is preferably configured such that the average length of the smallest mark and the smallest space among the group of pre-pits is less than or equal to $\lambda/(5.76\ NA)$, where $\lambda$ is the reproduction light wavelength of the reproduction optical system and NA is the numerical aperture of the reproduction optical system.

In a case where the average length of the smallest mark and the smallest space in the group of pre-pits is greater than $\lambda/(5.76\ NA)$, the generation of clocks for reproducing information recorded on the information recording layer is possible even if the recording format of the pre-pits is an on-pit format, as will be mentioned later.

This makes it possible to obtain necessary reproducing characteristics by complementing reproducing characteristics even if the reproducing characteristics deteriorate.

That is, when the average length of the smallest mark and the smallest space in the group of pre-pits is less than or equal to $\lambda/(5.76\ NA)$, there is a remarkable difference in reproducing characteristic depending on the recording format (in-pit recording format or on-pit recording format) of the group of pre-pits.

According to the foregoing configuration, even if the average length of the smallest mark and the smallest space in the group of pre-pits is less than or equal to $\lambda/(5.76\ NA)$, the information recorded on the information recording layer by the group of pre-pits can be reproduced. This makes it possible to prevent deterioration of reproducing characteristics, obtained satisfactory reproducing characteristics, and improve recording capacity.

The optical information recording medium of the present invention is preferably configured such that: each of the two or more information recording layers is indicated by information to be a layer configured to enable the reproduction optical system to reproduce the information recorded by the group of pre-pits, the information being contained in disk-type identification information indicating a type of the optical information recording medium; and the disk-type identification information is recorded on either of the two or more information recording layers by a recording method that renders the disk-type identification information more easily detectable than the information recorded as the marks and the spaces.

According to the foregoing configuration, each of the two or more information recording layers is indicated by information to be a layer configured to enable the reproduction optical system to reproduce the information recorded by the group of pre-pits, the information being contained in disk-type identification information indicating a type of the optical information recording medium.

That is, the disk-type identification information contains information indicating that the optical information recording medium is a multilayer super-resolution optical information recording medium.

Moreover, the disk-type identification information is recorded on an information recording layer stacked on the group of pre-pits by a recording method that renders the disk-type identification information more easily detectable than the information recorded as the marks and the spaces.

In the case of reproduction of the information recorded as the marks and the spaces on the multilayer super-resolution optical recording medium, it is necessary to make reproduction laser power (intensity of the reproduction light) larger than in the case of reproduction of information recorded on an optical information recording medium (non-multilayer super-resolution optical information recording medium) having marks and spaces formed at a higher density than the multilayer super-resolution optical recording medium.

For this reason, an attempt to reproduce information on a non-multilayer super-resolution optical information recording medium by reproduction laser power by which to reproduce information on the multilayer super-resolution optical recording medium may result in destruction of the non-multilayer super-resolution optical information recording medium.

The foregoing configuration makes it possible to determine whether or not the optical information recording medium is a multilayer super-resolution optical information recording medium by confirming disk-type identification information before increasing reproduction laser power by which to reproduce information recorded as the marks and the spaces on the multilayer super-resolution optical recording medium.

This prevents information on a non-multilayer super-resolution optical information recording medium from being mistakenly reproduced by reproduction laser power increased for reproduction of information recorded on an information recording layer as the marks and the spaces. This makes it possible to provide a highly versatile optical information recording medium.

The optical information recording medium of the present invention is preferably configured such that the recording method is a method for recording information indicated by a plurality of stripes formed by irradiating the information recording layer with pulse laser light, the plurality of stripes having widths in units of 10 μm and lengths in units of 100 μm to units of mm.

The foregoing configuration allows the reproduction optical system to read the disk-type identification information and an individual identification number even if a radial direction position of focusing or reproduction light irradiation is slightly off while the reproduction optical system is carrying out reproduction to read the disk-type identification information and the individual identification number.

Further, use of a dedicated pulse laser light irradiation device makes it possible to comparatively easily record disk-type identification information and an individual identification number.

The optical information recording medium of the present invention is preferably configured such that the disk-type identification information and an individual identification number are recorded on a radial position located closer to a center of the optical information recording medium than an information recording region that requires tracking for information reproduction, the individual identification number being information for individually identifying the optical information recording medium.

Recording of the disk-type identification information and the individual identification number by a recording method that allows easy detection makes it possible to reproduce the disk-type identification information and the individual identification number even if the radial direction position of reproduction light irradiation is slightly off. As a region in which to record the disk-type identification information and the individual identification number, a region having a predetermined length along the radial direction and corresponding to a single circle along the circumferential direction.

Securement of such a region in which to record the disk-type identification information and the individual identification number results in a decrease in information recording region in which to store other information.

According to the foregoing configuration, the radial position on which the disk-type identification information and the individual identification number are recorded is located closer to the center of the optical information recording medium than the information recording region that requires tracking for information reproduction. The decline in recording capacity of the information recording region that requires tracking can be curbed as compared with a case where the radial position is located further from the center of the optical information recording medium than the information recording region.

An optical information recording medium of the present invention includes: a light transmittable layer having an incident surface on which reproduction light is incident; two or more information recording layers; a substrate, the light transmittable layer, the information recording layers, and the substrate being stacked in this order from an incident side on which the reproduction light is incident; and an intermediate layer that separates the information recording layers from each other, the two or more information recording layers having information recorded thereon as marks and spaces by a predetermined modulation method, the two or more information recording layers each including (i) a group of pre-pits constituting the marks and the spaces and (ii) a super-resolution film, the marks and the spaces constituted by the group of pre-pits having different lengths, an average length of a smallest mark that is smallest in length among the marks constituted by the group of pre-pits and a smallest space that is smallest in length among the space constituted by the group of pre-pits being less than or equal to a resolution limit of a reproduction optical system for reproducing the information recorded on the information recording layers, the resolution film being a film that enables the reproduction optical system to reproduce information recorded by the group of pre-pits, the group of pre-pits being in an in-pit format by which the marks are formed more depressed than the spaces with respect to the incident surface on which the reproduction light is incident.

According to the foregoing configuration, the group of pre-pits is in an in-pit format by which the marks are formed more depressed than the spaces with respect to the incident surface on which the reproduction light is incident. This makes it possible to, even if the marks and the spaces are disposed so that the average length of the smallest mark and the smallest space is less than or equal to the resolution limit of the reproduction optical system, prevent deterioration of the reproducing characteristics of information that is obtained by the reproduction optical system reproducing the information recorded on the information recording layers.

INDUSTRIAL APPLICABILITY

The present invention is applicable in particular to a read-only optical information recording medium including a plurality of information recording layers and having a high recording density of information.

REFERENCE SIGNS LIST 1, 1a, 100 Optical information recording medium
10 Cover layer (light transmittable layer)
20, 120 First information recording layer
23, 43 Super-resolution film
30 Intermediate layer
31, 51, 51a Group of pre-pits
32, 52 Mark
33, 53 Space
40, 40a, 140 Second information recording layer
50, 50a Substrate

The invention claimed is:

1. An optical information recording medium reproducing device for reproducing an optical information recording medium, the optical information recording medium including:
a light transmittable layer having an incident surface on which reproduction light is incident;
two or more information recording layers;
a substrate, the light transmittable layer, the information recording layers, and the substrate being stacked in this order from an incident side on which the reproduction light is incident; and
an intermediate layer that separates the information recording layers from each other,
the two or more information recording layers having information recorded thereon as marks and spaces by a predetermined modulation method,
the two or more information recording layers each including (i) a group of pre-pits constituting the marks and the spaces and (ii) a super-resolution film,
the marks and the spaces constituted by the group of pre-pits having different lengths,
an average length of a smallest mark that is smallest in length among the marks constituted by the group of pre-pits and a smallest space that is smallest in length among the space constituted by the group of pre-pits being less than or equal to a resolution limit of a reproduction optical system for reproducing the information recorded on the information recording layers,
the resolution film being a film that enables the reproduction optical system to reproduce information recorded by the group of pre-pits,
the group of pre-pits being in an in-pit format by which the marks are formed more depressed than the spaces with respect to the incident surface on which the reproduction light is incident,
each of the two or more information recording layers being indicated by information to be a layer configured to enable the reproduction optical system to reproduce the information recorded by the group of pre-pits, the information being contained in disk-type identification information indicating a type of the optical information recording medium,
the disk-type identification information being recorded on either of the two or more information recording layers by a recording method that renders the disk-type identification information more easily detectable than the information recorded as the marks and the spaces,
the optical information recording medium reproducing device comprising:
a disk-type identification confirming section which detects the disk-type identification information and confirms a disk type of the disk-type identification information; and
a clock generating section which generates a clock for reproducing the information recorded by the group of pre-pits.

* * * * *